(12) United States Patent
Maghrabi

(10) Patent No.: US 11,268,007 B2
(45) Date of Patent: Mar. 8, 2022

(54) LIGNIN DERIVATIVES BASED DRILLING FLUID ADDITIVE

(71) Applicant: INGEVITY SOUTH CAROLINA, LLC, North Charleston, SC (US)

(72) Inventor: Shadaab S. Maghrabi, Summerville, SC (US)

(73) Assignee: INGEVITY SOUTH CAROLINA, LLC, North Charleston, SC (US)

(*) Notice: Subject to any disclaimer, the term of this patent is extended or adjusted under 35 U.S.C. 154(b) by 146 days.

(21) Appl. No.: 16/572,190

(22) Filed: Sep. 16, 2019

(65) Prior Publication Data
US 2020/0087562 A1 Mar. 19, 2020

Related U.S. Application Data

(60) Provisional application No. 62/731,834, filed on Sep. 15, 2018.

(51) Int. Cl.
*C09K 8/36* (2006.01)

(52) U.S. Cl.
CPC ..................... *C09K 8/36* (2013.01)

(58) Field of Classification Search
None
See application file for complete search history.

(56) References Cited

U.S. PATENT DOCUMENTS

| | | | |
|---|---|---|---|
| 3,492,228 A * | 1/1970 | Kim | C09K 8/32 507/108 |
| 3,671,428 A | 6/1972 | Chung et al. | |
| 4,172,937 A | 10/1979 | Suemata et al. | |
| 4,233,162 A * | 11/1980 | Carney | C09K 8/22 507/108 |
| 4,421,655 A | 12/1983 | Cowan et al. | |
| 4,562,236 A * | 12/1985 | Lin | C08H 6/00 527/400 |
| 4,710,586 A | 12/1987 | Arvind et al. | |
| 4,737,295 A * | 4/1988 | Cowan | C08H 6/00 507/103 |
| 7,256,159 B2 | 8/2007 | Guichard et al. | |
| 7,906,464 B2 | 3/2011 | Davidson | |

(Continued)

OTHER PUBLICATIONS

Alhamad, Luai, et al., A Review of Organic Acids Roles in Acidizing Operations for Carbonate and Sandstone Formations, Paper presented at the SPE International Conference and Exhibition on Formation Damage Control, Lafayette, Louisiana, USA, Feb. 2020. doi: https://doi.org/10.2118/199291-MS.

(Continued)

*Primary Examiner* — John J Figueroa
(74) *Attorney, Agent, or Firm* — Bryan D. Zerhusen, Esq.; Nicholas R. Herrel, Esq.; Cantor Colburn LLP

(57) ABSTRACT

A composition containing a blend, reaction product, or mixture thereof, of (A) one or more hydrophobizing component or agent (e.g., an amine or amide containing compound), and (B) one or more phenolic material or composition comprising phenolic polymers or salts thereof (e.g., lignin, a lignin derivative, or mixture thereof), which may be utilized as a drilling fluid additive or as a component of a drilling fluid additive, is described. A method of making the composition or drilling fluid additive is also described. Further, a drilling fluid containing the drilling fluid additive or composition is described.

45 Claims, 5 Drawing Sheets

(56) References Cited

U.S. PATENT DOCUMENTS

| | | | | |
|---|---|---|---|---|
| 2006/0073984 A1* | 4/2006 | Patel | ............... | C09K 8/20 |
| | | | | 507/129 |
| 2006/0278437 A1* | 12/2006 | Guichard | ............... | C09K 8/502 |
| | | | | 175/65 |
| 2007/0299142 A1* | 12/2007 | Crews | ............... | C09K 8/584 |
| | | | | 516/135 |

OTHER PUBLICATIONS

Al-Ibrahim, Hussain, et al., Chelating Agent for Uniform Filter Cake Removal in Horizontal and Multilateral Wells: Laboratory Analysis and Formation Damage Diagnosis, Paper presented at the SPE Saudi Arabia Section Annual Technical Symposium and Exhibition, Al-Khobar, Saudi Arabia, Apr. 2015. doi: https://doi.org/10.2118/177982-MS.

Baracarb® Product Data Sheet Mar. 25, 2013; www.halliburton.com/baroid.

CAS 37203-80-8 "C" slurry (Jan. 31, 2016).

CAS 66071-92-9, Safety Data Sheet "Black Liquor" May 30, 2015.

CAS 68910-05-4, Amine Hst, (typically having an amine value from 600-850 mgKOH/g, or combinations thereof) Jul. 13, 2017.

CAS 8068-05-1 (by reacting the "A" slurry with sodium bisulfite under pressure, and spray drying the resultant slurry) Jan. 2016.

Hernandez, Cesar I., et al., Lessons Learned from Medium and Extended Reach High Pressure Wells in Mexico South, AADE-11-NTCE-12, American Association of Drilling Engineers 2011 (Apr. 2011).

International Preliminary Report on Patentability for PCT/US2019/051310 dated Mar. 9, 2021.

Konduri, KR., et al., Production of Water-Soluble Hardwood Kraft Lignin via Sulfomethylation Using Formaldehyde and Sodium Sulfite, ACS Sustainable Chem. Eng. 2015, 3, 6, 1172-1182 (May 8, 2015).

Ogbunuju, E., et al., A Novel Approach to Salvaging Well Completions with Mud Damage Using a Specialized Fluid System; The First Cases in Nigeria, SPE-1993014 (an example of a complexing agent-based breaker solution for barite) Feb. 2020.

Omland, Tor H., et al., Weighting Material Sag. Annual Transactions of the Nordic Rheology Society, vol. 12, Jan. 2004.

Zubatt, M. A., et al., Improved Producibility after Delayed Filter Cake Breaker Treatment in the Safaniya Offshore Field in Saudi Arabia, Paper presented at the SPE Kuwait International Petroleum Conference and Exhibition, Kuwait City, Kuwait, Dec. 2012. doi: https://doi.org/10.2118/163357-MS.

Archinivu, Ezinne C., "Protic Ionic Liquids for Lignin Extraction—A Lignin Characterization Study", Int J Mol Sci. Feb. 2018; 19(2): 428.

Tyagi et. al., "Imidazoline and its derivatives: An overview", Journal of Oleo Science, 56, (5), 211-222 (2007).

Maghrabi, S., et al., "SPE-195182-MS—Design and Development of a Novel Fluid Loss Additive for Invert Emulsion Drilling Fluids from a Renewable Raw Material", (prepared for presentation at the SPE Oklahoma City Oil and Gas Symposium held in Oklahoma City, Oklahoma, USA, Apr. 9-10, 2019).

* cited by examiner

LIGNIN DERIVATIVES BASED DRILLING FLUID ADDITIVE

CROSS-REFERENCE TO RELATED APPLICATIONS

The present application claims priority to U.S. Provisional Application 62/731,834, filed 15 Sep. 2018 and titled LIGNIN DERIVATIVES BASED DRILLING FLUID ADDITIVE, which is incorporated herein by reference in its entirety.

TECHNICAL FIELD

The present disclosure relates to a composition that can be utilized as an additive to reduce fluid loss in drilling fluids. The present disclosure also relates to a method of making the composition, and a drilling fluid comprising the composition.

BACKGROUND

A drilling fluid (also known as "mud") is a specially designed fluid that is circulated through an oil or gas wellbore as the wellbore is drilled to facilitate the drilling operation. The drilling fluid can be a water-based drilling fluid (water-based mud) or an oil-based drilling fluid (oil-based mud).

Oil-based drilling fluid or mud is a widely used drilling fluid in oil and gas production industry. Drilling fluids or muds are used to cool the bit, lubricate the drill string, suspend and transport cuttings, control hydrostatic pressure, and maintain stability. Oil-based drilling fluids or muds are composed of oil as a continuous phase and water as a dispersed phase together with emulsifiers, wetting agents, gellants, etc. The oil phase typically comprises diesel, kerosene, fuel oil, crude oil, or mineral oil. Water-based drilling fluids or muds are composed of water as a continuous phase and oil as a dispersed phase together with, e.g., viscosifiers, fluid loss control agents, weighting agents, lubricants, emulsifiers, corrosion inhibitors, salts, pH control agents, etc.

Fluid-loss additives are added to muds or drilling fluids to minimize filtrate losses to the formation while drilling. Minimizing filtrate losses to the formation helps to maintain drilling fluid stability. If a high filtrate loss with water (in the filtrate) occurs in shale formation, it may lead to shale instability. Drilling fluid instability and shale instability are signs which, if not timely controlled, may lead to major problems like heavy sagging of the oil based muds, poor hole cleaning, shale sloughing, hole collapse etc. A low filtrate loss, on the other hand, results in a thin filter cake which is necessary to prevent stuck pipe situations. Thus, fluid-loss control additives perform a very important function.

Traditional fluid-loss additives include black powder-like and white powder-like additives. Commonly used black powder-like additives include (a) oxidized and causticized lignite, (b) amine treated lignite or organophilic lignite, and (c) Gilsonite. Oxidized and/or sulfonated asphalts may also be used as fluid loss additives in oil-based drilling fluids. Lignite, such as causticized lignite, lignosulfonates like chromium lignosulfonate are also used as filtrate loss additives in water-base drilling fluids.

Oxidized and causticized lignite is a mineral component of lignite, which is similar to brown coal. Lignite is found in surface deposits worldwide. Lignite is mined and put into piles where it can oxidize in the air before it is dried, ground, and bagged for use in drilling fluids. The humic acid content of lignite, which varies widely, controls its solubility. The soluble and colloidal lignite components both help in fluid-loss control. Soluble components serve as clay deflocculants and improve filter cake quality. Colloidal lignite helps plug off the permeable parts of filter cake. When straight lignite is added to a mud, caustic soda is also needed to dissolve it. Pre-causticized lignite is also commonly available, which contains NaOH or KOH already mixed with lignite. Adding chromium salts improves high-temperature performance, but their use is limited by health safety and environment (HSE) concerns.

Amine treated lignite or Organophilic lignite is straight lignite or causticized lignite that has been treated with quaternary amine compounds to make it oil dispersible in oil- and synthetic-base muds.

Gilsonite is a black, lustrous, carbonaceous resin classified as an asphaltite. Its proper name is uintaite, and it is found in Utah, USA. An important characteristic of gilsonite is its softening-point temperature. Being a hydrocarbon, it is naturally wetted by the oil. In water-base muds, it is used as a shale-stabilizing additive and is difficult to evaluate unless tested at or above its softening point. As a hydrocarbon, the powder must be coupled to water by using a glycol or similar water-wetter.

White powder-like additives include styrene methacrylate or styrene butadiene polymers. Such additives are described in U.S. Pat. No. 7,256,159. These are used as high performance fluid-loss control agents and can control fluid-loss at lower dosages and at higher temperatures as compared to the black powders.

Fluid-loss control additives perform a very important function. There is need for superior performing fluid loss additives. At the same time, there is need for environmentally friendly and economical fluid-loss control additives. Since lignocellulosic biomass is one of the most abundantly available renewable material, a lignin-based fluid-loss control additive for incorporation into muds or drilling fluid is highly desirable.

SUMMARY

An aspect of the present disclosure provides a composition that can be utilized as a drilling fluid additive. The composition comprises a blend, reaction product, or mixture thereof, of: (A) one or more hydrophobizing components or agents (e.g., an amine or amide containing compound), and (B) one or more phenolic material or composition comprising phenolic polymers or salts thereof (e.g., a cross-linked phenolic polymer, lignin, a lignin derivative, or salts thereof).

In any aspect or embodiment described herein, at least one of: the phenolic polymers are cross-linked; and the hydrophobizing component or agent is an amine or amide containing compound.

In any aspect or embodiment described herein, the phenolic material or composition includes at least one of: lignin, lignin derivative, and salts thereof. In any aspect or embodiment described herein, the lignin derivative is selected from the group consisting of (i) a first sulfonated lignin compound having a sulfonate group located on aliphatic part of the lignin, (ii) a second sulfonated lignin compound having a sulfonate group located on aromatic part of the lignin, (iii) a third sulfonated lignin compound having a sulfonate group located on aromatic part of the lignin and another sulfonate group located on aliphatic part of the lignin, (iv) alkoxylated lignin (e.g., ethoxylated lignin or propoxylated lignin); (v)

esterified lignin (e.g., lignin esterified at the hydroxyl group, the carboxyl group, or both); (vi) hydroxypropylated lignin; (vii) phenolated lignin; (viii) alkylated lignin; (ix) urethanized lignin; (x) hydroxyalkylated lignin; (xi) sulfomethylated lignin; (xii) nitrated lignin (e.g., a nitro group added to at least one aromatic group of the lignin); (xiii) azo coupled lignin (e.g., azo group coupled to at least one aromatic group of the lignin), or (xiv) combinations thereof.

In any aspect or embodiment described herein, the blend, reaction product, or mixture thereof, further includes formaldehyde.

In any aspect or embodiment described herein, the blend, reaction product, or mixture thereof, includes at least one of: the first sulfonated lignin compound that includes or is a sulfonated Kraft lignin; the second sulfonated lignin compound that includes or is a sulfomethylated Kraft lignin; and the third sulfonated lignin compound that includes or is a Kraft lignin that has been sulfonated and sulfomethylated.

In any aspect or embodiment described herein, the blend, reaction product, or mixture thereof, includes at least one of: the first sulfonated lignin compound that has a degree of sulfonation between about 0.1 and about 4.0, the second sulfonated lignin compound that has a degree of sulfonation between about 0.1 and about 4.0; and the third sulfonated lignin compound that has a degree of sulfonation between about 0.1 and about 4.0.

In any aspect or embodiment described herein, the phenolic material or composition includes at least one of: Organosolv lignin, milled wood lignin, cellulotic enzyme lignin, enzymatic mild acidolysis lignin, lignin extracted with ionic liquids, slurry A, slurry C, Indulin AT, Indulin C, black liquor, Kraft lignosulfonates, Kraft lignin, sulfite lignin, sulfomethylated Kraft lignin, derivatives thereof, and salts thereof.

In any aspect or embodiment described herein, the hydrophobizing component or agent includes at least one of a fatty amine or amidoamine, a fatty imidazoline, a fatty quaternary amine compound, a fatty imidazolinium compound, and salts thereof.

In any aspect or embodiment described herein, the fatty amine or amidoamine is prepared by reacting tall oil fatty acid with an amine (such as an ethyleneamine) having at least two (e.g., 2, 3, 4, 5, 6, 7, or more) secondary amine groups (e.g., reacting at a temperature of about 150° C. to about 300° C.).

In any aspect or embodiment described herein, the hydrophobizing component or agent includes a fatty quaternary amine compound that includes at least one of a diamidoamine quaternary amine compound and an ester of quaternary amine compound.

In any aspect or embodiment described here, the hydrophobizing component or agent includes at least one of Bis-(isostearic acid amidoethyl)-N-polyethoxy-N-methyl ammonium methosulfate, N, N-bis (tallow amidoethyl) N-polyethoxy N-methylammonium methosulfate, Di (nortallowyloxyethyl) dimethyl Ammonium Chloride, tallow amine, amidoamine, and combinations thereof.

In any aspect or embodiment described herein, the composition comprises at least one of: about 5 to about 75 percent by weight of the hydrophobizing component or agent; and about 25 to about 95 percent by weight of the phenolic material or composition.

In any aspect or embodiment described herein, the composition comprises at least one of: about 25 to about 45 percent by weight of the hydrophobizing component or agent; and about 55 to about 75 percent by weight of the phenolic material or composition.

In any aspect or embodiment described herein, the blend, reaction product, or mixture thereof, further comprises formalin that comprises at least one of: about 30 to about 40% by weight of formaldehyde, and about 10 to about 15% by weight of methanol.

In any aspect or embodiment described herein, the composition is a liquid (e.g., a slurry or a dissolvable enclosure or pod (e.g., polyvinyl alcohol film enclosure or pod) comprising the liquid or slurry) or a particulate (e.g., spray dried composition, pellets, and/or powder).

A further aspect of the present disclosure provides a drilling fluid comprising an oil and a drilling fluid additive that comprises or is the composition of the present disclosure.

In any aspect or embodiment described herein, at least one of: the hygroscopic liquid is $CaCl_2$ brine, and the oil is diesel; and the drilling fluid comprises about 0.25 to about 20 pounds per barrel (lbs/bbl) by weight of the drilling fluid additive.

Another aspect of the present disclosure provides a method of making the composition or drilling fluid additive of the present disclosure. The method comprises: blending (A) one or more hydrophobizing component or agent, as described herein, and (B) one or more phenolic material or composition comprising phenolic polymers or salts thereof, as described herein.

In any aspect or embodiment described herein, at least one of: the blending is performed under conditions that results in a reaction product of the blended components; the phenolic polymers are cross-linked; the hydrophobizing component or agent is an amine or amide containing compound; the phenolic material or composition includes lignin, lignin derivative, or salts thereof.

In any aspect or embodiment described herein, at least one of: (A) the lignin derivative is selected from the group consisting of: a first sulfonated lignin compound having a sulfonate group located on aliphatic part of the lignin, a second sulfonated lignin compound having a sulfonate group located on aromatic part of the lignin, a third sulfonated lignin compound having a sulfonate group located on aromatic part of the lignin and another sulfonate group located on aliphatic part of the lignin, alkoxylated lignin (e.g., ethoxylated lignin or propoxylated lignin), esterified lignin (e.g., lignin esterified at the hydroxyl group, the carboxyl group, or both), hydroxypropylated lignin, phenolated lignin, alkylated lignin, urethanized lignin, hydroxyalkylated lignin, sulfomethylated lignin, nitrated lignin (e.g., a nitro group added to at least one aromatic group of the lignin), azo coupled lignin (e.g., azo group coupled to at least one aromatic group of the lignin), and combinations thereof; and (B) the phenolic material or composition includes at least one of: Organosolv lignin, milled wood lignin, cellulotic enzyme lignin, enzymatic mild acidolysis lignin, lignin extracted with ionic liquids, slurry A, slurry C, Indulin AT, Indulin C, black liquor, Kraft lignosulfonates, Kraft lignin, sulfite lignin, sulfomethylated Kraft lignin, derivatives thereof, and salts thereof.

In any aspect or embodiment described herein, at least one of: the lignin derivative is the first sulfonated lignin compound having a sulfonate group located on aliphatic part of the lignin and having a degree of sulfonation between 0.1 and 2.2; preparing an aqueous solution of the phenolic material or composition, wherein the phenolic material or composition includes at least one of the lignin, the lignin derivative, or salts thereof, and is about 5 to about 55 percent by weight of the aqueous solution; the blending includes formaldehyde; and heating the blended mixture to a temperature of 25° C. to 120° C.

In any aspect or embodiment described herein, the method further comprises spray drying the blend, reaction product, or mixture thereof, to obtain a powder from the blend, reaction product, or mixture thereof.

In any aspect or embodiment described herein, the lignin derivative is the second sulfonated lignin compound having a sulfonate group located on aromatic part of the lignin, and having a degree of sulfonation between about 0.1 and about 2.9.

In any aspect or embodiment described herein, the lignin derivative is the third sulfonated lignin compound having a sulfonate group located on aromatic part of the lignin and another sulfonate group located on aliphatic part of the lignin, and having a degree of sulfonation between about 0.1 and about 2.9.

These and other embodiments are described in detail below.

BRIEF DESCRIPTION OF THE DRAWINGS

FIG. 2 is a GPC chromatogram of Indulin AT.

DETAILED DESCRIPTION

Figure 1:
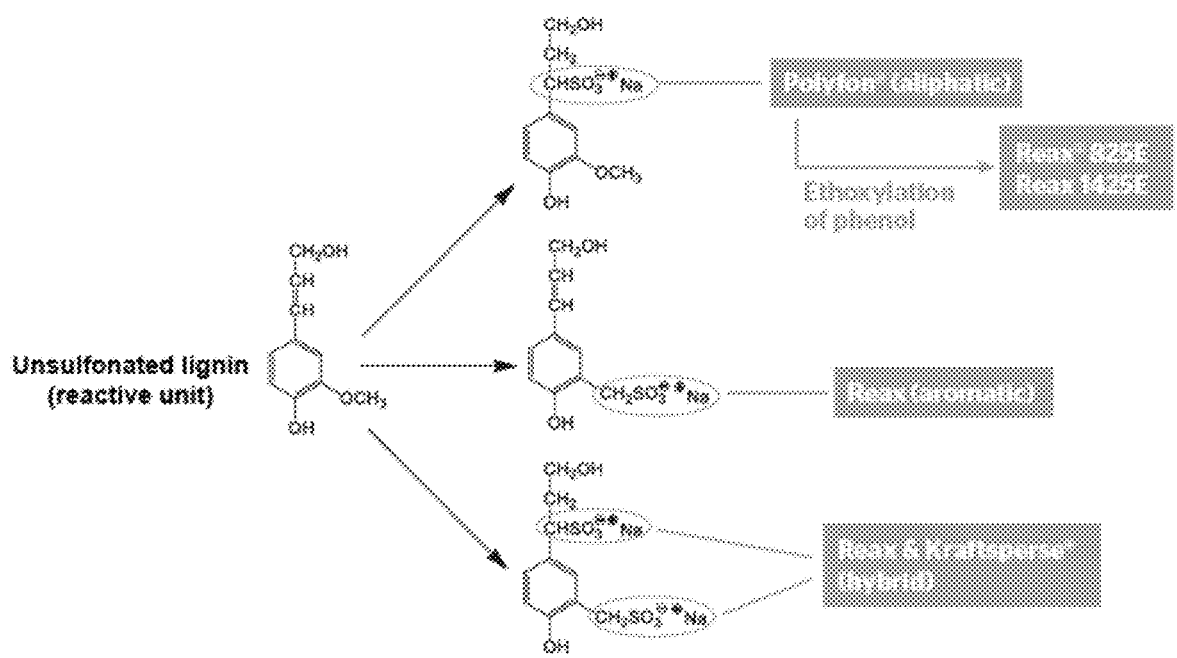
FIG. 1 illustrates the general chemical structures of the various lignin derivatives.

The inventors have surprisingly found that a blend, reaction product, or mixture thereof (e.g., a blend and/or a reaction product), of a phenolic material or composition and a hydrophobizing component or agent provides superior fluid loss control properties when used as an additive in drilling fluids, such as an oil-based drilling fluid or a water-based drilling fluid. The composition and additive described herein surprisingly reduces the fluid loss and improves electrical stability (ES) without adversely affecting rheology of, e.g., the oil-based drilling fluid.

Unless otherwise defined, all technical and scientific terms used herein have the same meaning as commonly understood by one of ordinary skill in the art to which this disclosure belongs. The terminology used in the description is for describing particular embodiments only and is not intended to be limiting of the disclosure.

Where a range of values is provided, it is understood that each intervening value, to the tenth of the unit of the lower limit unless the context clearly dictates otherwise (such as in the case of a group containing a number of carbon atoms in which case each carbon atom number falling within the range is provided), between the upper and lower limit of that range and any other stated or intervening value in that stated range is encompassed within the disclosure. The upper and lower limits of these smaller ranges may independently be included in the smaller ranges is also encompassed within the disclosure, subject to any specifically excluded limit in the stated range. Where the stated range includes one or both of the limits, ranges excluding either both of those included limits are also included in the disclosure.

The following terms are used to describe the present disclosure. In instances where a term is not specifically defined herein, that term is given an art-recognized meaning by those of ordinary skill applying that term in context to its use in describing the present disclosure.

The articles "a" and "an" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

As used herein in the specification and in the claims, the phrase "at least one," in reference to a list of one or more elements, should be understood to mean at least one element selected from anyone or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a nonlimiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, in certain methods described herein that include more than one step or act, the order of the steps or acts of the method is not necessarily limited to the order in which the steps or acts of the method are recited unless the context indicates otherwise.

The term "effective" is used to describe an amount of a compound, composition or component which, when used within the context of its intended use, effects an intended result. The term effective subsumes all other effective amount or effective concentration terms, which are otherwise described or used in the present application.

An aspect of the present disclosure provides a composition, which may be utilized in or as a drilling fluid additive. The composition or drilling fluid additive comprises a blend, reaction product, or mixture thereof, of (A) one or more (e.g., 1, 2, 3, 4, 5, 6, 7, or more) hydrophobizing components or agents (e.g., an amine or amid containing compound), and (B) one or more (e.g., 1, 2, 3, 4, 5, 6, 7, or more) phenolic material or composition comprising phenolic polymers or salts thereof (e.g., a cross-linked phenolic polymer, lignin, a lignin derivative, or salts thereof). For example, in any aspect or embodiment described herein, the phenolic polymers are cross-linked. As a further example, in any aspect or embodiment, the hydrophobizing component or agent is an amine or amide containing compound. Thus, in an embodiment, the phenolic polymers are cross-linked, and the hydrophobizing component or agent is an amine or amide containing compound.

In any aspect or embodiment described herein, the phenolic material or composition includes or is at least one of (e.g., 1, 2, 3, 4, 5, 6, 7, 8, or more, each individually selected from): lignin, lignin derivative, or salts thereof. In any aspect or embodiment described herein, the lignin derivative is at least one derivative selected from the group consisting of: (i) a first sulfonated lignin compound having a sulfonate group located on aliphatic part of the lignin, (ii) a second sulfonated lignin compound having a sulfonate group located on aromatic part of the lignin, (iii) a third sulfonated lignin compound having a sulfonate group located on aromatic part of the lignin and another sulfonate group located on aliphatic part of the lignin, (iv) alkoxylated lignin; (v) esterified lignin; (vi) hydroxypropylated lignin; (vii) phenolated lignin; (viii) alkylated lignin; (ix) urethanized lignin; (x) hydroxyalkylated lignin; (xi) sulfomethylated lignin; (xii) nitrated lignin; (xiii) azo coupled lignin, or (xiv) combinations thereof. The (xiv) combinations thereof, includes lignin that have a plurality of derivatizations, e.g. a plurality of deriviatizations as described above. For example, in any aspect or embodiment described therein (i) the first sulfonated lignin compound having a sulfonate group located on aliphatic part of the lignin, (ii) the second sulfonated lignin compound having a sulfonate group located on aromatic part of the lignin, and/or (iii) the third sulfonated lignin compound having a sulfonate group located on aromatic part of the lignin and another sulfonate group located on aliphatic part of the lignin, may be further derivitized through alkyoxylation, esterification, hydroxypropylation, prnelocation, alkylation, urethanization, hydroxyalkylated, nitration, and/or azo coupling. For example, in any aspect or embodiment described therein, the lignin derivative includes or is alkoxylated sulfonated lignin; esterified sulfonated lignin; hydroxypropylated sulfonated lignin; phenolated sulfonated lignin; alkylated sulfonated lignin; urethanized sulfonated lignin; hydroxyalkylated sulfonated lignin; nitrated sulfonated lignin; azo coupled sulfonated lignin, or combinations thereof.

In any aspect or embodiment described herein, the alkoylated lignin includes or is at least one of: ethoxylated lignin or propoxylated lignin. For example, in any aspect or embodiment described herein, the lignin derivate includes or is at least one of: an ethoxylated compound, such as Reax® 1425E or Reax® 825E, which are ethoxylated sulfonated lignin.

In any aspect or embodiment described herein, the esterified lignin includes or is at least one of a lignin esterified at the hydroxyl group, a lignin esterified at the carboxyl group, and a lignin esterified at the hydroxyl group and at the carboxyl group. In any aspect or embodiment described herein, the nitrated lignin includes or is a lignin in which a nitro group has been added to at least one aromatic group of the lignin. In any aspect or embodiment described herein, the azo couple lignin includes or is a lignin in which an azo group has been added to at least one aromatic group of the lignin.

In any aspect or embodiment describe herein, the blend, reaction product, or mixture thereof, has a pH of less than about 12 (e.g., about 9.5 to about 11.5). For example, in any aspect or embodiment described herein, the method of making the composition of the present disclosure includes adjusting the pH of the blend, reaction product, or combination thereof, to a about 9.5 to about 11 (e.g., about 9.5, about 10, about 10.5, about 11). Thus, for example, the pH of the blend, reaction production, or combination thereof, is about 9.5, about 9.75, about 10, about 10.25, about 10.5, about 10.75, about 11, about 11.25, or about 11.5).

In an embodiment, the blend, reaction product, or mixture thereof further comprises formaldehyde. For example, in any aspect or embodiment described herein, the blend, reaction product, or mixture thereof, further comprises a composition having at least one of: about 30 to about 40% by weight of formaldehyde, and about 10 to about 15% by weight of methanol (e.g., formalin).

In any aspect or embodiment described herein, the blend, reaction product, or mixture thereof, includes at least one of: the first sulfonated lignin compound that includes or is a sulfonated Kraft lignin; the second sulfonated lignin compound that includes or is a sulfomethylated Kraft lignin; and the third sulfonated lignin compound that includes or is a Kraft lignin that has been sulfonated and sulfomethylated. For example, in any aspect or embodiment described herein, the blend, reaction product, or mixture thereof, includes the first sulfonated lignin compound that includes or is a sulfonated Kraft lignin. By way of further example, in any aspect or embodiment described herein, the blend, reaction product, or mixture thereof, includes the second sulfonated lignin compound that includes or is a sulfomethylated Kraft lignin. Furthermore, in any aspect or embodiment described herein, the blend, reaction product, or mixture thereof, includes the third sulfonated lignin compound that includes or is a Kraft lignin that has been sulfonated and sulfomethylated.

The lignin derivative can be a lignin derivate produced by Kraft pulping process or a sulfite pulping process. In an embodiment, the lignin derivative is produced by Kraft pulping process. Unlike the sulfite pulping process, Kraft pulping process produces unmodified lignin which can be further processed.

In any aspect or embodiment described herein, the Kraft lignin is sulfonated under controlled conditions to obtain a sulfonated Kraft lignin compound or composition. In any aspect or embodiment described herein, the lignin derivative cis a sulfonated Kraft lignin having a specific degree of sulfonation.

In any aspect or embodiment described herein, the lignin derivative is a first sulfonated lignin compound having a sulfonate group located on aliphatic part of the lignin or a composition having a first sulfonated lignin compound. For example, the first sulfonated lignin compound or composition can be a sulfonated Kraft lignin. The sulfonated Kraft lignin may have a specific degree of sulfonation. In any aspect or embodiment described herein, the sulfonated Kraft lignin has a degree of sulfonation between about 0.1 to about 4.0. For example, in any aspect or embodiment described herein, the degree of sulfonation of the first sulfonated lignin described here is selected from about 0.1 to about 4.0, about 0.5 to about 2.5, about 0.5 to about 3.0, about 0.8 to about 3.0, about 1 to about 2.5, or about 1.2 to 2.2.

The degree of sulfonation is a function of the amount of organically bound sulfur present in material and may be determined by any appropriate method known to those skilled in the art. For example, and in no way limiting on the method that may be utilized, sulfonation may be determined by calculating the total sulfur content minus the sum of the amount of sulfur present in the starting composition, and the sulfur present in the free sulfite and sulfate. The percent of free sulfite, the percent of free sulfate, and the percent of total sulfur may be determined by any method known to those skilled in the art.

In any aspect or embodiment described herein, the sulfonated and/or sulfomethylated lignin of the present disclosure has a degree of sulfonation of about 0.1 to about 4.0. For example, in any aspect or embodiment described herein, the degree of sulfonation of the sulfonated lignin, as described herein, can be about 0.1 to about 3.5, about 0.1 to about 3.0, about 0.1 to about 2.5, about 0.1 to about 2.0, about 0.1 to about 1.5, about 0.1 to about 1.0, about 0.5 to about 4.0, about 0.5 to about 3.5, about 0.5 to about 3.0, about 0.5 to about 2.5, about 0.5 to about 2.0, about 0.5 to about 1.5, about 1.0 to about 4.0, about 1.0 to about 3.5, about 1.0 to about 3.0, about 1.0 to about 2.5, about 1.0 to about 2.0, about 1.5 to about 4.0, about 1.5 to about 3.5, about 1.5 to about 3.0, about 1.5 to about 2.5, about 2.0 to about 4.0, about 2.0 to about 3.5, about 2.0 to about 3.0, about 2.5 to about 4.0, about 2.5 to about 3.5, or about 3.0 to about 4.0.

In any aspect or embodiment described herein, the first sulfonated lignin compound composition includes or is at least one compound or composition selected from the group consisting of Polyfon® H, Polyfon® O, Polyfon® T, Polyfon® F, Kraftplex, and combinations thereof. Polyfon® is a registered trademark of Ingevity Inc. and the Polyfon® series compounds are commercially available from Ingevity Inc. The Polyfon® series compounds are prepared from non-sulfonated kraft lignin of "A" slurry (CAS 8068-05-1) by reacting the "A" slurry with sodium bisulfite under pressure, and spray drying the resultant slurry.

In any aspect or embodiment described herein, the Kraft lignin is sulfonated under controlled conditions to obtain a sulfomethylated Kraft lignin compound. For example, in any aspect or embodiment described herein, the lignin derivative can be a sulfomethylated Kraft lignin having a specific degree of sulfonation, as described above.

In any aspect or embodiment described herein, the lignin derivative is a second sulfonated lignin compound having a sulfonate group located on aromatic part of the lignin or a composition comprising the second sulfonated lignin compound. For example, in any aspect or embodiment described herein, the second sulfonated lignin compound can be a sulfomethylated Kraft lignin. Furthermore, the sulfomethylated Kraft lignin may have a specific degree of sulfonation. In any aspect or embodiment described herein, the sulfomethylated Kraft lignin has a degree of sulfonation between about 0.1 to about 4.0, as described above. For example, in any aspect or embodiment described herein, the degree of sulfonation of the sulfonated and/or sulfomethylated lignin described here is selected from about 0.1 to about 4.0, about 0.5 to about 3.5, about 1.5 to about 3.1, and about 1.8 to about 2.9

In any aspect or embodiment described herein, the second sulfonated lignin compound or composition includes or is at least one compound or composition selected from the group consisting of Reax® 907, Reax® 85A, Reax® 81A, Reax® 83A, Reax® 80D, Reax® 88A, Reax® 100 M, Reax® 1425E, Reax® 825E, HyAct®, and combinations thereof. Reax® is a registered trademark of Ingevity Inc. and the Reax® series compounds are commercially available from Ingevity Inc. Other suitable compounds from the Reax® and Polyfon® series can also be used For example, in any aspect or embodiment described herein, the blend, reaction product, or mixture thereof, includes at least one of: the first sulfonated lignin compound that has a degree of sulfonation between about 0.1 and about 4, and the second sulfonated lignin compound that has a degree of sulfonation between about 0.1 and about 4. In any aspect or embodiment described herein, the blend, reaction product, or mixture thereof, the lignin derivative includes or is the first sulfonated lignin compound that has a degree of sulfonation between about 0.1 and about 4, as described above. In any aspect or embodiment described herein, the blend, reaction product, or mixture thereof, the lignin derivative includes or is the second sulfonated lignin compound that has a degree of sulfonation between about 0.1 and about 4, as described above.

In any aspect or embodiment described herein, the lignin derivative is a third sulfonated lignin compound having a sulfonate group located on aromatic part of the lignin and another sulfonate group located on aliphatic part of the lignin or a composition comprising the third sulfonated lignin compound. The third sulfonated lignin compound may be called a hybrid sulfonated lignin compound. Such compounds are commercially available under tradenames Reax® (e.g., Reax® 88B) and Kraftsperse®. Reax® and Kraftsperse® are a registered trademarks of Ingevity Inc. and the Reax® and Kraftsperse® series compounds are commercially available from Ingevity Inc.

The general chemical structures of the various lignin derivatives are summarized in FIG. 1.

In any aspect or embodiment described herein, the phenolic material or composition includes at least one of: Organosolv lignin, milled wood lignin, cellulotic enzyme lignin, enzymatic mild acidolysis lignin, lignin extracted with ionic liquids, slurry A, slurry C, Indulin AT, Induclin C, black liquor, Kraft lignosulfonates, Kraft lignin, sulfite lignin, sulfomethylated Kraft lignin, derivatives thereof, and salts thereof. In any aspect or embodiment described herein, the phenolic material or composition is at least one of: Organosolv lignin, milled wood lignin, cellulotic enzyme lignin, enzymatic mild acidolysis lignin, lignin extracted with ionic liquids, slurry A, slurry C, Indulin AT, Indulin C, black liquor, Kraft lignosulfonates, Kraft lignin, sulfite lignin, sulfomethylated Kraft lignin, derivatives thereof, and salts thereof. In any aspect or embodiment described herein, the phenolic material or composition is: Organosolv lignin, milled wood lignin, cellulotic enzyme lignin, enzymatic mild acidolysis lignin, lignin extracted with ionic liquids, slurry A, slurry C, Indulin AT, Indulin C, black liquor, Kraft lignosulfonates, Kraft lignin, sulfite lignin, sulfomethylated Kraft lignin, derivatives thereof, and salts thereof.

Thus, in any aspect or embodiment described herein, the phenolic material or composition may include or is lignin or a composition comprising lignin. For example, in any aspect or embodiment described herein, the lignin compound or composition is Kraft lignin. In any aspect or embodiment described herein, the lignin can be at least one of the "A" slurry (CAS 8068-05-1), the "C" slurry (CAS 37203-80-8), or a mixture thereof, that comes from, e.g., paper mills. In any aspect or embodiment described herein, the lignin includes or is Indulin AT. Indulin AT is amine treated "A" slurry that is then spray dried. As used herein, A Slurry, C Slurry, and Black liquor, can be utilized interchangeably with their composition or generic description (e.g., alkali lignin, alkali lignin slurry, sodium salt of lignin, lignin sodium salt slurry, and spent Kraft pulping liquor, respectively), as described herein. Black liquor (CAS 66071-92-9) is spent Kraft pulping liquor, which may comprise about 30-60 wt. % degraded hemicellulose, about 20-50 wt. % degraded lignin, less than or equal to about 5 wt. % sodium hydroxide, less than or equal to about 5 wt. % sodium sulfide, about 5-15 wt. % sodium carbonate, and less than or equal to about 10 wt. % sodium sulfate. Black liquor typically has a solids content of about 39 to about 44 wt. %. Furthermore, the lignin may be a spray dried version of A Slurry, (e.g., Indulin AT), C Slurry (e.g., Indulin C), black liquor, similar compositions, or mixtures thereof.

While organosol lignin and how to prepare the same is known to those skilled in the art, the following description of an exemplary method of preparing the organosol lignin is provide as an exemplary method. Organosol lignin can be prepared by, e.g., pulping a lignocellulosic feedstock, e.g. chipped wood, through contact with an aqueous solvent at temperatures ranging from 140 to 220° C., thereby breaking down lignin through hydrolytic cleavage of alpha aryl-ether links into fragments that are soluble in the solvent. Solvents that can be used include acetone, methanol, ethanol, butanol, ethylene glycol, formic acid, and acetic acid.

While milled wood lignin and how to prepare the same is known to those skilled in the art, the following description of an exemplary method of preparing the milled wood lignin is provide as an exemplary method. For example, milled wood lignin can be prepared by: (1) extracting ball-milled wood with aqueous p-dioxane (about 4%) at room temperature; (2) drying the extracts and then dissolving in acetic acid; (3) precipitating the dissolved extract into water; and (4) drying and then dissolving in ethylene chloride and ethanol; and (5) precipitate the dissolved mixture into diethyl ether.

While cellulolytic enzyme lignin and how to prepare the same is known to those skilled in the art, the following description of an exemplary method of preparing the cellulolytic enzyme lignin is provide as an exemplary method. For example, cellulolytic enzyme lignin can be prepared by: (1) adding ball milled biomass to cellulose and incubating for 3 days; (2) washing with water and extracting twice with aqueous p-dioxane; (3) dissolving the extract in acetic acid; (4) precipitate the dissolved mixture into water; (5) isolate lignin; and (6) wash the isolated lignin twice with water, and suspended in water.

While enzymatic mild acidolysis lignin and how to prepare the same is known to those skilled in the art, the following description of an exemplary method of preparing the enzymatic mild acidolysis lignin is provide as an exemplary method. For example, enzymatic mild acidolysis lignin can be prepared by: (1) treating ball-milled wood with cellulose; (2) shaking in a water bath using citrate buffer (pH 4.5); (3) washing soluble material with acidified deionized water twice; (4) freeze drying the washed soluble materials; (5) treating cellulytic lignin with aqueous p-dioxane; (5) filtering and neutralizing with sodium bicarbonate; (6) add to acidified deionized water and inducate overnight; (7) isolating precipitated lignin; and (8) wash twice with deionized water and freeze-drying the washed lignin.

While lignin extracted with ionic liquids and how to prepare the same is known to those skilled in the art, and may be performed numerous ways, the following reference is provided as a description of exemplary methods of preparing lignin extracted with ionic liquids: Ezinne C. Archinivu, Protic Ionic Liquids for Lignin Extraction—A Lignin Characterization Study. Int J Mol Sci. 2018 February; 19(2): 428, which is incorporated by reference herein in its entirety.

In any aspect or embodiment described herein, the phenolic material or composition includes or is a combination of one or more of: the first sulfonated lignin compound, the second sulfonated lignin compound, the third sulfonated lignin compounds, and a non-sulfonated lignin compound (e.g., lignin, as described herein).

The composition of the present disclosure comprises a blend and/or a reaction product of one or more phenolic material or composition that comprises phenolic polymers or salts thereof (such as a cross-linked phenolic polymer, lignin, a lignin derivative, or mixtures thereof), and one or more hydrophobizing component or agent (such as an amine or amide containing compound). The hydrophobizing component or agent may be any suitable amine or amide containing compound. For example, in any aspect or embodiment described herein, the hydrophobizing component or agent includes at least one of a fatty amine, an amidoamine, a fatty imidazoline, a fatty quaternary amine compound, a fatty imidazolinium compound, and salts thereof. In any aspect or embodiment described herein, the hydrophobizing component or agent is at least one of a fatty amine, an amidoamine, a fatty imidazoline, a fatty quaternary amine compound, a fatty imidazolinium compound, and salts thereof. In any aspect or embodiment described herein, the hydrophobizing component or agent is a fatty amine, an amidoamine, a fatty imidazoline, a fatty quaternary amine compound, a fatty imidazolinium compound, and salts thereof. For example, in certain embodiments, the fatty amine compound described above includes a linear or branched fatty chain with more than 8 carbons.

Other suitable amine compounds include primary amines, primary ether amines, tertiary amines, fatty amines, fatty diamines, ether diamines, quaternary amines, fatty quaternary amines, fatty amido amine, fatty amido amine quats, fatty diamidoamines, fatty diamidoamines, quats, fatty imdidazolines, fatty Imidazolinium Quats, fatty ester quaternary amines, fatty amine alkoxylates, dialkyldimethly quats, Benzyl Quats, Alkoxy Alkyl Quats, Trialkyl Monomethyl Quats, and combinations thereof. In any aspect or embodiment described herein, the hydrophobizing component or agent includes or is at least one compound selected from the group consisting of a fatty amine compound, an amidoamine compound, a fatty quaternary amine compound, and combinations thereof.

Fatty amines are made by reacting ammonia with fatty acid to form nitriles, followed by hydrogenation. The alkyl chains in fatty amines can be derived from natural fats and oils such as tallow, soybean oil, tall oil, coconut, canola, and rapeseed. Exemplary fatty amine compounds include hydrogenated tallow amine, palmityl amine, stearyl amine, coco amine, lauryl amine, tallow amine, oleyl amine, and combinations thereof.

In any aspect or embodiment described herein, the hydrophobizing component or agent includes or is at least one a fatty quaternary amine compound selected from the group consisting of a diamidoamine quaternary amine compound and an ester of quaternary amine compound. For example, in any aspect or embodiment described herein, the hydrophobizing component or agent includes or is a fatty quaternary amine compound that includes or is at least one of a diamidoamine quaternary amine compound and an ester of quaternary amine compound.

In any aspect or embodiment described herein, the hydrophobizing component or agent includes or is at least one compound selected from the group consisting of Bis-(isostearic acid amidoethyl)-N-polyethoxy-N-methyl ammonium methosulfate, N, N-bis (tallow amidoethyl) N-polyethoxy N-methylammonium methosulfate, Di (nortallowyloxyethyl) dimethyl Ammonium Chloride, tallow amine, amidoamine, and combinations thereof.

In any aspect or embodiment described herein, the hydrophobizing component or agent includes or is an imidazoline produced from an amidoamine by loss of water molecule. Suitable compounds are described in Tyagi et. al., "Imidazoline and its derivatives: An overview", Journal of Oleo Science, 56, (5), 211-222 (2007).

In any aspect or embodiment described herein, the hydrophobizing component or agent comprises at least one amidoamine. For example, the amidoamine can be a reaction product of a fatty acid (such as tall oil fatty acid or Soya bean fatty acid or any other source of fatty acid) and an amine. Alternatively, in any aspect or embodiment described herein, the fatty acid source can also be streams from the tall oil distillation process, such as distilled tall oil (which has between 10-30% rosin), C2B, Liqrene D, Liqrene 100, Altapyne 1483. C2B, Liqrene D, Liqrene 100, Altapyne 1483, each of which are tall oil products commercially available from Ingevity, Inc. The acid number of these fatty acid sources can be from 100-200 mgKOH/gm. Amine can be DETA (Diethylene triamine), TETA (Triethylene Tetramine), TEPA (Tetraethylene pentamine), AMINE HST (CAS #68910-05-4) typically having an amine value from 600-850 mgKOH/g, or combinations thereof.

The fatty acid in the reaction product can be from 40-90% w/w and the amine can be from 60-10% w/w. For example, in any aspect or embodiment described herein, the fatty acid may be present in an amount of about 40 to about 90, about 40 to about 80, about 40 to about 70, about 40 to about 60, about 40 to about 50, about 50 to about 90, about 50 to about 80, about 50 to about 70, about 50 to about 60, about 60 to about 90, about 60 to about 80, about 60 to about 70, about 70 to about 90, about 70 to about 80, or about 80 to about 90% w/w. By way of further example, in any aspect or embodiment described herein, the amine is present in an amount of about 10 to about 60, about 10 to about 50, about 10 to about 40, about 10 to about 30, about 10 to about 20, about 20 to about 60, about 20 to about 50, about 20 to about 40, about 20 to about 30, about 30 to about 60, about 30 to about 50, about 30 to about 40, about 40 to about 60, about 40 to about 50, or about 50 to about 60% w/w.

The amine value of the reaction product can be from 1050 mgKOH/g to 15 mgKOH/g. An example of typical process to make such an Amido Amine is given below. Thus, in any aspect or embodiment described herein, the amine value of the reaction product is about 15 to about 1050, about 15 to about 900, about 15 to about 800, about 15 to about 700, about 15 to about 600, about 15 to about 500, about 15 to about 400, about 15 to about 300, about 15 to about 200, about 15 to about 100, about 100 to about 1050, about 100 to about 900, about 100 to about 800, about 100 to about 700, about 100 to about 600, about 100 to about 500, about 100 to about 400, about 100 to about 300, about 100 to about 200, about 200 to about 1050, about 200 to about 900, about 200 to about 800, about 200 to about 700, about 200 to about 600, about 200 to about 500, about 200 to about 400, about 200 to about 300, about 300 to about 1050, about 300 to about 900, about 300 to about 800, about 300 to about 700, about 300 to about 600, about 300 to about 500, about 300 to about 400, about 400 to about 1050, about 400 to about 900, about 400 to about 800, about 400 to about 700, about 400 to about 600, about 400 to about 500, about 500 to about 1050, about 15005 to about 900, about 500 to about 800, about 500 to about 700, about 500 to about 600, about 600 to about 1050, about 600 to about 900, about 600 to about 800, about 600 to about 700, about 700 to about 1050, about 700 to about 900, about 700 to about 800, about 800 to about 1050, about 800 to about 900, about 900 to about 1050 mgKOH/g.

In any aspect or embodiment described herein, the fatty amine is prepared by reacting tall oil fatty acid with at least one an amine (such as an ethyleneamine) having at least two (e.g., 2, 3, 4, 5, 6, 7, or more) secondary amine groups. In any aspect or embodiment described herein, the fatty amine is prepared by reacting tall oil fatty acid with diethylenetriamine (DETA); hydroxyethyldiethylenetriamine (HE-DETA); 2- piperazinoethanol; triethylenetetramine (TETA); tetraethylenepentamine (TEPA); pentaethylene hexamine (PEHA), heptaethyleneoctamine (HEOA); hexaethyleneheptamine (HEHA); amine HST; amine DCT; aminoethylpiperazine (AEP); dimethylaminopropylamine (DMAPA); aminoethylethanolamine (AEEA); diethanolamine (DEA); triethanolamine (TEA); monoethanolamine; ethylene diamine; diamino propane; diamino butane; diamino pentane; hexamethylene diamine; diamino alkanes, alkenes or alkynes with up to 12 carbon atoms separating the amino groups, diethylenetriamine, triethylene tetramine, tetraethylenepentamine, and mixtures thereof. For example, in any aspect or embodiment described herein, the tall oil fatty acid and the at least one amine having at least two secondary amine groups is reacted under heat (e.g., about 150° C. to about 300° C., about 200° C. to about 275° C., or about 258° C.). For example, the fall oil fatty acid and the amine may be heated to a temperature of about 150° C. to about 300° C., about 150° C. to about 275° C., about 150° C. to about 250° C., about 150° C. to about 225° C., about 150° C. to about 200° C., about 150° C. to about 175° C., about 175° C. to about 300° C., about 175° C. to about 275° C., about 175° C. to about 250° C., about 175° C. to about 225° C., about 175° C. to about 200° C., about 200° C. to about 300° C., about 200° C. to about 275° C., about 200° C. to about 250° C., about 200° C. to about 225° C., about 225° C. to about 300° C., about 225° C. to about 275° C., about 225° C. to about 250° C., about 250° C. to about 300° C., about 250° C. to about 275° C., or about 275° C. to about 300° C.

In any aspect or embodiment described herein, the fatty amine or amidoamine, of the fatty imidazoline has an amine value ranging between about 80 to about 300 (e.g., about 210 to about 280) mgKOH/g. For example, the fatty amine has an amine value of about 80 to about 300, about 80 to about 275, about 80 to about 250, about 80 to about 225, about 80 to about 200, about 80 to about 175, about 80 to about 150, about 80 to about 125, about 100 to about 300, about 100 to about 275, about 100 to about 250, about 100 to about 225, about 100 to about 200, about 100 to about 175, about 100 to about 150, about 125 to about 300, about 125 to about 275, about 125 to about 250, about 125 to about 225, about 125 to about 200, about 125 to about 175, about 150 to about 300, about 150 to about 275, about 150 to about 250, about 150 to about 225, about 150 to about 200, about 175 to about 300, about 175 to about 275, about 175 to about 250, about 175 to about 225, about 200 to about 300, about 200 to about 275, about 200 to about 250, about 225 to about 300, about 225 to about 275, or about 250 to about 300 mgKOH/g. Preparation of a non-limiting exemplary amidoamine reaction product, includes: adding about 350 grams (70% w/w) of the C2-B (preheated) with an acid number of 167.2 mg/gm to a five neck round bottom flask (1000 ml). Under stirring at 90 rpm, 150 grams (30% w/w) of Amine HST is added, which gives an exotherm. Once the temperature is stabilized, the reaction mixture is ramped to 200° C. and held at 200° C. for about 2 hours. After about 2 hours, the reaction mixture is cooled to 100° C. The amino-amine reaction product is then transferred to a sample bottle. The amine value of this exemplary C2-B based amido-amine (i.e., the amido-amine reaction product) is determined to be 133.9 mgKOH/g. In any aspect or embodiment described herein, the amidoamine can be further heated, wherein the amidoamine loses a molecule of water to form a ring structured—e.g., imidazoline.

Amine value can be determined by any appropriate method known those skilled in the art. For example, in any aspect or embodiment described herein, amine value can be determined through titration. For example, in any aspect or embodiment described herein, amine value can be determined by titration with 0.5N HCl. An exemplary method that may be used to determine amine value through titration is described below in the Examples.

Acid number can be determined by any appropriate method known those skilled in the art. For example, in any aspect or embodiment described herein, acid number can be determined by titration. For example, in any aspect or embodiment described herein, acid number can be determined by titration with 0.5N KOH. An exemplary method to determine acid number through titration is described below in the Examples.

In any aspect or embodiment described herein, the fatty imidazoline has a imidazoline content of about 35 to about 85% by weight. For example, in any aspect or embodiment described herein, the imidazoline content of the fatty imidazoline is about 35 to about 85% by weight, about 35 to about 75% by weight, about 35 to about 65% by weight, about 35 to about 55% by weight, about 35 to about 45% by weight, about 45 to about 85% by weight, about 45 to about 75% by weight, about 45 to about 65% by weight, about 45 to about 55% by weight, about 55 to about 85% by weight, about 55 to about 75% by weight, about 55 to about 65% by weight, about 65 to about 85% by weight, about 65 to about 75% by weight, about 75 to about 85% by weight of the fatty imidazoline composition. The imidazoline content can be determined by any method appreciated to those skilled in the art. For example, and in no way intended to be limiting, the imidazoline content can be determined by infrared ration. For example, a drop of the fatty imidazoline composition is placed on the Attenuated Total Reflection (ATR) crystal of a Fourier Transform Infrared Spectrometer (such as, a Nicolet 6700 FT-IR) and a spectrum collected. The peak intensities in absorbance mode for the amide (1645-1675 cm-1) and for the imidazoline (1604-1612 cm-1) are ratioed according to the equation:

$$IR = 100 \times \frac{I_{imidazoline}}{I_{imidazoline} + I_{amide}}.$$

The above described exemplary amidoamine is provided as an example of a suitable amidoamine and is not intended to be a limiting example. For example, the fatty acid can be replaced, for example, by tall oil fatty acid (TOFA), and the amine can be substituted by DETA.

In any aspect of embodiment described herein, the composition comprises about 5 to about 75 weight percent by weight of the hydrophobizing component or agent. In any aspect or embodiment described herein, the composition comprises about 25 to about 95 percent by weight of the phenolic material or composition. For example, in any aspect or embodiment described herein, the composition or drilling additive comprises at least one of: about 5 to about 75 percent by weight of the hydrophobizing component or agent, and about 25 to about 95 percent by weight of the phenolic material or composition.

In any aspect or embodiment described herein, the composition or drilling additive comprises at least one of: about 25 to about 45 percent by weight of the hydrophobizing component or agent, and about 55 to about 75 percent by weight of the phenolic material or composition. For example, in any aspect or embodiment described herein, the composition or drilling additive comprises: (1) at least one of about 38 percent by weight of the hydrophobizing component or agent, and about 62 percent by weight of the phenolic material or composition; or (2) at least one of about 28 percent by weight of the hydrophobizing component or agent, and about 72 percent by weight of the phenolic material or composition.

In any aspect or embodiment described herein, the composition or drilling fluid additive (e.g., the blend, reaction product, or mixture thereof) further comprises formaldehyde. For example, the composition or drilling fluid additive further comprises formalin.

In any aspect or embodiment described herein, the composition or drilling fluid additive is a slurry, a dissolvable enclosure or pod (e.g., polyvinyl alcohol film enclosure or pod) comprising the liquid or slurry, a spray dried composition, pellets, a powder, or a mixture thereof.

A further aspect of the present disclosure provides a drilling fluid comprising an oil and a drilling fluid additive that comprises or is the composition of the present disclosure. In any aspect or embodiment described herein, the drilling fluid additive is the composition of the present disclosure.

In any aspect or embodiment described herein, the drilling fluid may contain a suitable or effective amount of the drilling fluid additive. In any aspect or embodiment described herein, the drilling fluid comprises at least one of: about 0.25 to about 20 pounds per barrel (lbs/bbl) by weight of the drilling fluid additive. In any aspect or embodiment described herein, at least one of: the hygroscopic liquid is $CaCl_2$ brine, the oil is diesel, or a combination thereof.

Another aspect of the present disclosure provides a method of making the composition of the present disclosure or drilling fluid additive of the present disclosure. The method comprises: blending (A) one or more hydrophobizing component or agent, as described herein, and (B) one or more phenolic material or composition comprising phenolic polymers or salts thereof, as described herein.

In any aspect or embodiment described herein, at least one of: the blending is performed under conditions that results in a reaction product of the blended components, as described herein; the phenolic polymers are cross-linked; the hydrophobizing component or agent is compound comprising an amine, an amide, or both; the phenolic material or composition includes lignin, lignin derivative, or salts thereof.

In any aspect or embodiment described herein, at least one of: (A) the lignin derivative is selected from the group consisting of: a first sulfonated lignin compound having a sulfonate group located on aliphatic part of the lignin, a second sulfonated lignin compound having a sulfonate group located on aromatic part of the lignin, a third sulfonated lignin compound having a sulfonate group located on aromatic part of the lignin and another sulfonate group located on aliphatic part of the lignin, alkoxylated lignin (e.g., ethoxylated lignin or propoxylated lignin), esterified lignin (e.g., lignin esterified at the hydroxyl group, the carboxyl group, or both), hydroxypropylated lignin, phenolated lignin, alkylated lignin, urethanized lignin, hydroxyalkylated lignin, sulfomethylated lignin, nitrated lignin (e.g., a nitro group added to at least one aromatic group of the lignin), azo coupled lignin (e.g., azo group coupled to at least one aromatic group of the lignin), and combinations thereof; and (B) the phenolic material or composition includes at least one of: Organosolv lignin, milled wood lignin, cellulotic enzyme lignin, enzymatic mild acidolysis lignin, lignin extracted with ionic liquids, slurry A, slurry C, Indulin AT, Indulin C, black liquor, Kraft lignosulfonates, Kraft lignin, sulfite lignin, sulfomethylated Kraft lignin, derivatives thereof, and salts thereof.

In any aspect or embodiment of the method described herein, the lignin derivative includes or is the first sulfonated lignin compound having a sulfonate group located on aliphatic part of the lignin and having a degree of sulfonation between about 0.1 and about 4.0 (e.g., about 1.2 to about 2.2).

In any aspect or embodiment described herein, the method of making the composition or the drilling fluid of the present disclosure further comprises: (a) preparing an aqueous solution of one or more phenolic material or composition, as described herein (e.g., a lignin derivative as described herein), that comprises about 5 to about 55 percent by weight of the aqueous solution; (b) mixing the aqueous solution of lignin derivative with one or more hydrophobizing component or agent, as described herein; and (c) optionally adding formaldehyde, as described herein (e.g., formalin), to the mixture of step (b). In any aspect or embodiment, the method of making the composition or the drilling fluid of the present disclosure further comprises, heating the mixture (e.g., the phenolic material or composition, the hydrophobizing component or agent, and optionally, formaldehyde, each of which is described herein) to a temperature of about 25 to about 120° C. (e.g, about 60 to about 95° C.). For example, in any aspect or embodiment described herein, the method may comprise heating the mixture or blend for a period of at least about 1 minute (e.g., a period of about 1 minute to about 24 hours, or about 1 minute to about 18 hours, about 1 minute to about 14 hour, or about 1 minute to about 6 hours). By way of further example, in any aspect or embodiment described herein the mixture it heated to a temperature of about 25 to about 120° C., about 25 to about 110° C., about 25 to about 100° C., about 25 to about 90° C., about 25 to about 80° C., about 25 to about 70° C., about 25 to about 60° C., about 25 to about 50° C., about 25 to about 40° C., about 30 to about 120° C., about 30 to about 110° C., about 30 to about 100° C., about 30 to about 90° C., about 30 to about 80° C., about 30 to about 70° C., about 30 to about 60° C., about 30 to about 50° C., about 30 to about 40° C., about 40 to about 120° C., about 40 to about 110° C., about 40 to about 100° C., about 40 to about 90° C., about 40 to about 80° C., about 40 to about 70° C., about 40 to about 60° C., about 40 to about 50° C., about 50 to about 120° C., about 50 to about 110° C., about 50 to about 100° C., about 50 to about 90° C., about 50 to about 80° C., about 50 to about 70° C., about 50 to about 60° C., about 60 to about 120° C., about 60 to about 110° C., about 60 to about 100° C., about 60 to about 90° C., about 60 to about 80° C., about 60 to about 70° C., about 70 to about 120° C., about 70 to about 110° C., about 70 to about 100° C., about 70 to about 90° C., about 70 to about 80° C., about 80 to about 120° C., about 80 to about 110° C., about 80 to about 100° C., about 80 to about 90° C., about 90 to about 120° C., about 90 to about 110° C., about 90 to about 100° C., about 100 to about 120° C., about 100 to about 110° C., or about 110 to about 120° C.

In any aspect or embodiment described herein, the phenolic material or composition is an aqueous solution that includes, e.g., at least one of: lignin, the lignin derivative, and salts thereof, and the lignin, the lignin derivative, salts thereof, or combination thereof, is present in an amount of about 5 to about 55, about 5 to about 50, about 5 to about 45, about 5 to about 40, about 5 to about 35, about 5 to about 30, about 5 to about 25, about 5 to about 20, about 5 to about 15, about 10 to about 55, about 10 to about 50, about 10 to about 45, about 10 to about 40, about 10 to about 35, about 10 to about 30, about 10 to about 25, about 10 to about 20, about 15 to about 55, about 15 to about 50, about 15 to about 45, about 15 to about 40, about 15 to about 35, about 15 to about 30, about 15 to about 25, about 20 to about 55, about 20 to about 50, about 20 to about 45, about 20 to about 40, about 20 to about 35, about 20 to about 30, about 25 to about 55, about 25 to about 50, about 25 to about 45, about 25 to about 40, about 25 to about 35, about 30 to about 55, about 30 to about 50, about 30 to about 45, about 30 to about 40, about 35 to about 55, about 35 to about 50, about 35 to about 45, about 40 to about 55, about 40 to about 50, about 45 to about 55 percent by weight of an aqueous solution.

In any aspect or embodiment described herein, the method further comprises spray drying the blend, reaction product, or mixture thereof, to obtain a powder from the blend, reaction product, or mixture thereof.

In any aspect or embodiment described herein, the lignin derivative includes or is the second sulfonated lignin compound having a sulfonate group located on aromatic part of the lignin, and having a degree of sulfonation between about 0.1 and about 4 (e.g., about 0.1 to about 2.9).

The foregoing and other embodiments are further illustrated by the following examples, which are not intended to limit the effective scope of the claims. All parts and percentages in the examples and throughout the specification and claims are by weight of the final composition unless otherwise specified.

Exemplary Compositions Prepared Using Fatty Quaternary Amine Compounds

Acid Number and Amine Value Determination.

Two grams of the low titer fatty acid material or amine material was added to a beaker. The low titer fatty acid material was dissolved in methanol or a mixture of methanol and Toluene or isopropanol using agitation and/or heat, as required for complete dissolution. The amine material was dissolved in 75 mL of isopropanol, using agitation and/or heat, as required for complete dissolution. Acid number was determined via titration with 0.5N KOH in methanol and the amine value was determined via titration with 0.5 HCL in methanol on a 888 Titrando Autotitrator (Metrohm, Riverview, Fla.).

Example 1-Dry Method for Making the Fluid Loss Control Additive Comprising Quaternary Fatty Amine 5.7 g (equivalent to 38% w/w of mixture) of Bis-(isostearic acid amidoethyl)-N-polyethoxy-N-methyl ammonium methosulfate (available as TEGO® CI 691 (also known as REWOQUAT W 325), CAS number 185857-40-3, from Evonik Industries AG) was added to a weighing boat. Then, 9.3 g (equivalent to 62% w/w of mixture) of sulfonated Kraft lignin (available as POLYFON® T from Ingevity Corporation, SC) was added to prepare a mixture having total weight of 15 g. The POLYFON® T has a degree of sulfonation between 1.8 and 2.2.

The two reactants were blended with a spatula and then transferred to a glass bottle and capped. The glass bottle was placed in the oven at 60° C. for 12 hours. Occasionally, the glass bottle was vented. After 12 hours, the blended product was used for fluid loss testing. The product was called "Additive 9177-91I."

The above method was used to prepare several additives according the presently disclosed method (referred to herein as "exemplary additive" or "exemplary composition"). The additives were prepared using different sulfonated and sulfo-methylated Kraft lignin compounds (i.e. different POLYFON® and REAX® compounds available from Ingevity Corporation, SC). Similarly, different quaternary ammonium products were used. Further, instead of the 38%:62% ratio (in Additive 9177-91I) of fatty quaternary ammonium to Kraft lignin sulfonate, additional ratios (for example, 28%:72%, 50%:50%, or 60%:40%) were used.

Example 2: Fluid-Loss Performance Testing in an Oil-Based Drilling Fluid

Example 2.1: Preparation of an Oil-Based Drilling Fluid

An oil-based drilling fluid was prepared according to the composition shown in Table 2. Several oil-based drilling fluids were prepared according to the composition shown in Table 2, with the exception that they used different materials as fluid-loss control additives. Thus, Table 2 below shows representative composition of the oil-based drilling fluid used for performance testing of various fluid-loss control additives.

TABLE 2

Composition of Oil-Based Drilling Fluid Used for Performance Testing Of Fluid-Loss Control Additives.

| Component | Density | Volume (ml) | Weight (gm) | Mixing time (min) |
|---|---|---|---|---|
| Diesel Oil | 0.86 | 168 | 144.50 | 0 |
| Primary Emulsifier (carboxylic acid terminated fatty amine condensate and oxidized tall oil composition) | 0.93 | 6.5 | 6.00 | 1 |
| Lime | 2.23 | 1.3 | 3.00 | 1 |
| Fluid-loss control additive | | As given | As required | 1 |
| Secondary Emulsifier (carboxylic acid terminated fatty amine condensate) | 0.90 | 3.3 | 3.00 | 1 |
| Brine - CaCl$_2$ at 33.5% w/w concentration | 1.28 | 73.0 | 93.60 | 10 |
| Organophilic Clay | 1.60 | 1.3 | 2.00 | 15 |
| API Barium Sulfate | 4.20 | 111.9 | 470.00 | 10 |

The oil-based drilling fluid was prepared by sequentially adding the ingredients listed in Table 1 and mixing for the indicated time. Density of an oil-based drilling fluid obtained by the composition of Table 1 was 16.5 ppg (pounds per gallon). In Table 2, the concentration of the fluid loss additive was varied from 1 to 6 gram based on the type of the fluid loss additive.

After preparing the oil-based drilling fluid, the fluid was then hot rolled at 150° F. for 16 hours. The fluid was then remixed on a multi-mixer for 5 minutes. Rheology was checked, and ES was checked at 120° F. High Temperature High Pressure Fluid Loss (HTHP FL) test was run at 350° F., 500 psi. The rheology, ES and the HTHP filtration tests were performed according to the methods described in API Recommended Practice 13B-2, Fourth Edition, Recommended Practice for Field Testing of Oil-based Drilling Fluids.

Example 2.2: Fluid-Loss Performance Test 1

Nine samples of oil-based drilling fluids were prepared according to the composition shown in Table 2, with the exception that they used different materials to test for their fluid loss performance. A "control" sample of oil-based drilling fluid was prepared that contained no fluid-loss control additive. Eight oil-based drilling fluids were prepared which contained as fluid-loss control additive—commercially available amine treated lignite, commercially available styrene methacrylate polymer and different types of sulfo-methylated Kraft lignin (i.e Reax® 907, Reax® 85A); a sodium lignosulfonate (as available from sulfite pulping process) Reax® 260; a sulfonated kraft lignin (Polyfon® H), and fatty quaternary ammonium compound TEGO® CI 691 at 1.7 ppb, and 2.3 ppb, respectively. All of these fluids were subjected to high temperature high pressure fluid loss test according to the test method set by API using a static filter press. A summary of fluid-loss performances of these oil-based drilling fluids is provided in Table 3.

TABLE 3

Fluid-Loss Testing Results

| Serial No. | Fluid-loss control additive | Filtrate Loss (in ml) | Water in the filtrate (in ml) |
|---|---|---|---|
| 1 | No additive | 60 | 10 |
| 2 | Commercial Black Powder (Amine-treated lignite @6 ppb) | 8.0 | — |
| 3 | Commercial White Powder (Styrene methacrylate polymer @3 ppb) | 11.6 | 2.0 |

TABLE 3-continued

Fluid-Loss Testing Results

| Serial No. | Fluid-loss control additive | Filtrate Loss (in ml) | Water in the filtrate (in ml) |
|---|---|---|---|
| 4 | Reax ® 907 (sulfomethylated Kraft lignin with degree of sulfonation = 1.2 CAS# 68512-35-6) | 46.0 | 10.0 |
| 5 | Reax ® 85A (sulfomethylated Kraft lignin with degree of sulfonation = 0.8, CAS# 105859-97-0) | 50.0 | 12.0 |
| 6 | Reax ® 260 (Sodium lignosulfonate from sulfite process) | 55.0 | 15.6 |
| 7 | Polyfon ® H (sulfonated Kraft lignin with degree of sulfonation = 0.7, CAS# 8061-51-6) | 52.0 | 10.4 |
| 8 | TEGO ® CI 691 @ 1.7 ppb | 40 | 10 |
| 9 | TEGO ® CI 691 @ 2.3 ppb | 44.8 | 11 |

As seen in Table 3, the "control" drilling fluid demonstrated the maximum fluid loss of 60 ml with 10 ml of water. Presence of even a small amount of water is considered a sign of emulsion destabilization and is not desirable.

The commercial standards (namely, commercial black powder and commercial white powder) demonstrated controlled fluid losses of 8 and 11.6 ml. The commercial white powder was tested at 3 ppb since that was the recommended amount. The commercial white powder demonstrated 2 ml of water in the filtrate.

The lignin sulfonate derivatives (namely, the sulfonated Kraft lignin and the sulfomethylated Kraft lignin derivatives) all demonstrated over 45 ml of fluid loss with over 10 ml of water. TEGO® CI 691 was tested at 1.7 ppb and at 2.3 ppb and it had more than 40 ml of fluid loss with more than 10 ml of water. The fluid loss performance testing showed that the lignin sulfonate derivatives as well as the fatty quaternary ammonium compounds were not able to control fluid loss by themselves.

Example 2.3: Fluid-Loss Performance Testing 2

Additives according to the present disclosure (exemplary additive or composition) were also tested in a manner similar to that of the commercial additives (i.e. amine treated lignite styrene methacrylate polymer). The test results are summarized in Table 4.

When the exemplary additive were tested, improved fluid-loss control was observed with almost all of the tested exemplary additives of the present disclosure providing fluid losses of less than 25 ml (see, Table 4). Some of the exemplary composition performed better than the commercial standards with fluid losses less than 8 ml observed. For example, exemplary compositions 9177-91G, 9177-91H, 9177-94E, 9177-93B, 9177-93C, and 9177-93D performed better than commercial additives.

The improved fluid loss control was seen across all of the Polyfon® and Reax® reacted with fatty quaternary amine products. Thus, it can be concluded that the exemplary composition comprising blends, reaction products, or mixtures thereof, of the fatty quaternary amine and the lignin sulfonate derivatives unexpectedly demonstrated superior fluid-loss control in the oil-based drilling fluids.

TABLE 4

Fluid-Loss Testing Results for Exemplary Additives prepared by Dry Method

| Degree of Sulfonation | Additive Identity | Lignin derivative | % w/w of lignin derivative | Quaternary amine Type | % w/w of Quaternary amine | Fluid Loss (in ml) | Water in the filtrate (in ml) |
|---|---|---|---|---|---|---|---|
| 0.7 | 9177-88E | Polyfon ® H | 72% | TEGO CI 691[#1] | 28% | 9.6 | 0.4 |
| 1.2 | 9177-91I | Polyfon ® O | 72% | TEGO CI 691 | 28% | 10 | 0.2 |
| 2 | 9177-91J | Polyfon ® T | 72% | TEGO CI 691 | 28% | 10.4 | 0 |
| 3.3 | 9177-91K | Polyfon ® F | 72% | TEGO CI 691 | 28% | 21.6 | 0 |
| 0.7 | 9177-91C | Polyfon ® H | 62% | TEGO CI 691 | 38% | 14.4 | 3.2 |
| 1.2 | 9177-91F | Polyfon ® O | 62% | TEGO CI 691 | 38% | 2.4 | 0 |
| 2 | 9177-91G | Polyfon ® T | 62% | TEGO CI 691 | 38% | 2.4 | 0 |
| 3.3 | 9177-91H | Polyfon ® F | 62% | TEGO CI 691 | 38% | 12.4 | 0 |
| 1.2 | 9177-94E | Polyfon ® O | 62% | Variosoft LM 222[#2] | 38% | 6 | 0 |
| 2 | 9177-94S | Polyfon ® T | 62% | Variosoft LM 222 | 38% | 20.0 | 2.0 |
| 2 | 9177-94B | Polyfon ® T | 62% | TEGO CI 112[#3] | 38% | 14.4 | 2.0 |
| 0.8 | 9177-88C | Hyact | 72% | TEGO CI 691 | 28% | 22 | 6 |
| 1.2 | 9177-88D | Reax ® 907 | 72% | TEGO CI 691 | 28% | 16.8 | 3.6 |
| 0.8 | 9177-88F | Reax ® 85A | 72% | TEGO CI 691 | 28% | 20.4 | 3.2 |
| 0.8 | 9177-91A | Hyact | 62% | TEGO CI 691 | 38% | 20 | 4 |
| 1.2 | 9177-91B | Reax ®907 | 62% | TEGO CI 691 | 38% | 8.4 | 0 |
| 0.8 | 9177-91D | Reax ®85A | 62% | TEGO CI 691 | 38% | 18.4 | 3.6 |
| 1.3 | 9177-93A | Reax ®81A | 62% | TEGO CI 691 | 38% | 14.8 | 3 |
| 1.8 | 9177-93B | Reax ®83A | 62% | TEGO CI 691 | 38% | 6.4 | 0 |
| 2.3 | 9177-93C | Reax ®80D | 62% | TEGO CI 691 | 38% | 5.6 | 0 |
| 2.9 | 9177-93D | Reax ®88A | 62% | TEGO CI 691 | 38% | 3.6 | 0 |
| 3.4 | 9177-93E | Reax ®100M | 62% | TEGO CI 691 | 38% | 14.4 | 1 |
| 2.3 | 9177-94I | Reax ® 80D | 62% | Variosoft LM 222 | 38% | 26.0 | 6.0 |
| 2.9 | 9177-94I | Reax ® 88A | 62% | Variosoft LM 222 | 38% | 18.0 | 2.0 |
| 2.9 | 9177-94N | Reax ® 88A | 62% | TEGO CI 112 | 38% | 29.6 | 4.0 |
|  | 9177-91E | Reax ® 260 | 62% | TEGO Cl 691 | 38% | 20 | 2.8 |

[#1]TEGO ® CI - 691 is Bis-(isostearic acid amidoethyl)-N-polyethoxy-Nmethyl ammonium methosulfate. With CAS 185857-40-3
[#2]Variosoft LM 222 is a N,N-bis (tallow amidoethyl) N-polyethoxy N-methylammonium methosulfate with CAS # 68153-35-5
[#3]TEGO ® CI 112 is a di (nortallowyloxyethyl) dimethylammonium chloride in ethanol.

Example 3—Wet Method for Making the Fluid Loss Control Additive

Slurry of Polyfon® T was made for two different solid loadings of 37% w/w and 25% w/w with pH of solution about 10.5 for dissolving the Polyfon® T. Thus, to make 15 g of solid exemplary additive with 62 and 72% w/w Polyfon® T concentrations, the respective slurry weights were determined. TEGO® CI 691 was used as the fatty quaternary amine.

The weights of the components used for the wet blending and/or reaction are shown in Table 5. These amounts were taken in a glass bottle. The bottle was capped and placed in the oven @ 60° C. for 12 hours. The final products were in liquid form, this liquid can be used as is or it can be spray dried to obtain the dry powder. Testing was performed with the liquid form of the additive, and also with spray dried version of the additive.

Since the liquid form has water in it, the water content in the drilling fluid formulation was accordingly adjusted to maintain 6 ppb active material of the exemplary composition in the drilling fluid formulation (see, Table 6). The fluid loss performance of the liquid additives 9183-65A, B, C, D and spray dried additive 8998-22 were excellent with all of them giving controlled fluid losses of less than or equal to 10 ml (see, Table 5).

TABLE 5

Reactant concentrations and fluid loss performance.

| Product No. | Slurry solids (%) | Polyfon T in final product | Final prod. Wt. | Wt. of slurry | % TEGO CI 691 in final prod. | Wt. of TEGO CI 691 | % Activity of prod. | Fluid loss in ml for 6 ppb | Water in fluid loss (ml) |
|---|---|---|---|---|---|---|---|---|---|
| 9183-65A | 37% | 62% | 15 gm | 25.07 | 38% | 5.7 | 48.7 | 6.4 | — |
| 9183-65B | 37% | 72% | 15 gm | 29.12 | 28% | 4.2 | 45.0 | 7.6 | — |
| 9183-65C | 25% | 62% | 15 gm | 37.2 | 38% | 5.7 | 35.0 | 5.6 | — |
| 9183-65D | 25% | 72% | 15 gm | 43.2 | 28% | 4.2 | 31.6 | 10.0 | — |
| 8998-22* | — | 62% | — | — | 38% | 5.7 | 35.0 | 10.0** | — |

*spray dried powder from 9183-65C
**fluid loss at a concentration of 5.3 ppb

TABLE 6

Modified formulations of oil based drilling fluid to account for water in the liquid product.

|  | 9183-65A | 9183-65A | 9183-65A | 9183-65D |
|---|---|---|---|---|
| Diesel Oil low sulfur (gm) | 144.50 | 144.50 | 144.50 | 144.50 |
| Primary emulsifier (gm) | 6.00 | 6.00 | 6.00 | 6.00 |
| Lime (gm) | 3.00 | 3.00 | 3.00 | 3.00 |
| FLA liq. Form (gm) | 12.31 | 13.33 | 17.16 | 18.96 |
| Secondary emulsifier (gm) | 3.00 | 3.00 | 3.00 | 3.00 |
| CaCl2 salt (gm) | 31.36 | 31.36 | 31.36 | 31.36 |
| Water (gm) | 55.94 | 54.92 | 51.08 | 49.28 |
| Organoclay(gm) | 2.00 | 2.00 | 2.00 | 2.00 |
| API Barium Sulphate (gm) | 470.00 | 470.00 | 470.00 | 470.00 |

In conclusion, the exemplary compositions prepared with fatty quaternary amine compounds prepared by both dry and wet methods unexpectedly demonstrated superior fluid-loss control properties in drilling fluids.

Exemplary Compositions Prepared Using Fatty Amine Compounds

The compositions prepared with a fatty amine and lignin derivative (either Slurry A or Slurry C or the Indulin AT, or Kraft lignosulfonates like Reax® or Polyfon®) with or without formaldehyde were used as a fluid loss additive for oil-based drilling fluids. As described below, it is possible that the preparation of the composition or fluid loss additive of the present disclosure includes aggregation and/or the reaction of some of the components, such as a reaction involving the aromatic part of the lignin, a special form of Mannich reaction. Such a reaction is described in U.S. Pat. No. 4,562,236. The mixing of the components was performed under wet conditions and under a high pH so that the lignin or its derivatives are soluble enough react, should they so do so, with the formaldehyde, the fatty amine, or both, to occur. This blending/mixing was performed in aqueous conditions.

It is also possible that a reaction between the amine groups and the aldehydic groups occur, forming polyimines, which may cross link and aggregate the lignin, thereby increase the molecular weight of the lignin. The polyimine type of reactions are described in U.S. Pat. No. 4,172,937. Further, it is also possible that formaldehyde may also increase the molecular weight of the lignin by crosslinking the different lignin units via its phenolic structures. The crosslinking is suggested to occur via the methylol groups formed due to formaldehyde. Further, it is also possible that a reaction between imidazolines and lignin can occur to give increased molecular weight components in the reaction product.

Example 4—Method of Making the Fluid Loss Control Additive Comprising Fatty Amine/Imidazoline An aqueous slurry containing 25 w/w % of the lignin derivative was prepared. This slurry was made with either Indulin AT, or Reax®, or Polyfon® type lignin derivative. The method is explained with references to "Additive 9178-14-4" as an example in the Table below.

About 26.83 gm of the Indulin AT slurry was added to a bottle, this corresponds to 43.83% or 6.58 gm of the Indulin AT for a total of 15 gm of the active material for the blend and/or reaction. Similarly, 43.83% or 6.58 gm of the PC-2144 (a fatty imidazoline available from Ingevity Corporation, it has an Amine Value between 240-270) was added to the reaction bottle for a total of 15 gms of the active material. Then 5 gm of formalin (37% w/w formaldehyde in water) was added to the bottle which corresponds to 1.85 gm or 12.33% of the formaldehyde for a total of 15 gm of the material. It was ensured that the pH of the reaction mixtures in the bottles was no greater than about 12 so that the lignin derivative is soluble in the aqueous phase and available for the reaction. Though PC-2144 was utilized for the present example, other fatty imidazolines like PC-2142 with Amine Value=80-105, PC-2143, with Amine Value=220-240, Envacor 695 with amine value=240-265, Envacor 2039 with Amine Value=minimum 125, etc., may be used in its placed or their combination to get the best performance. These fatty imidazoline products are available from Ingevity Corporation. As described before the fatty imidazolines are derived from fatty amidoamines by loss of water from the amidoamine. More examples of the different compositions are given in Tables 7A and 7B.

The bottles were mounted on a thermostated rotisserie oven set at 90° C. for different durations as given in Tables 7A and 7B. The compositions prepared were available as liquid slurry and their activity was calculated.

Figure 2:
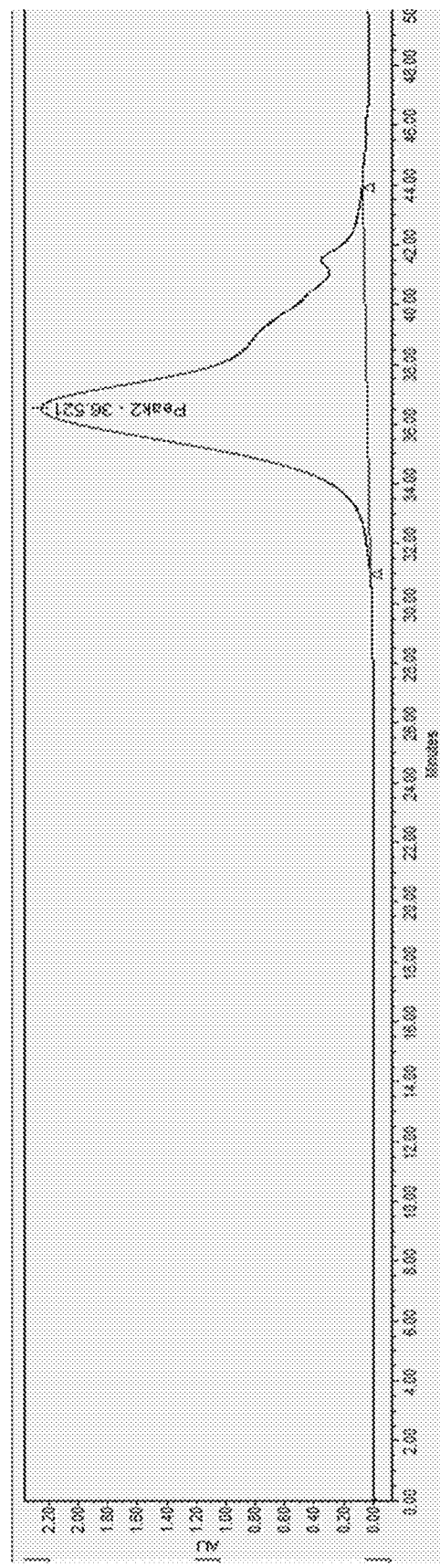
Figure 3:
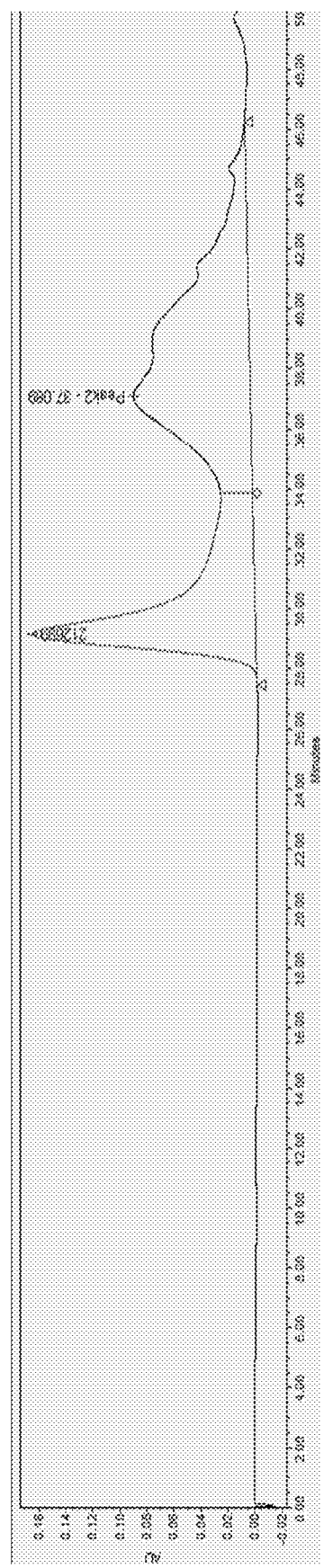
FIG. 3 is GPC chromatogram of sample 9178-14-2.

Samples of 9179-14-2, Indulin AT, 9178-14-9, and Reax 85A were run on a Waters Aqueous GPC with a UV detector set at a wavelength of 280 nm. A calibration curve for molecular weight was established with polymeric standards polystyrene sulfonic acid sodium salt to estimate the The Chromatograms of the Indulin AT and 9178-14-2 are shown in FIGS. 2 and 3, respectively. The Indulin AT has a typical weight average molecular weight (MW) of about 2,700 Daltons and the peak is spread out between 31-44 mins retention time approximately. However, the product made from the Indulin AT, i.e. 9178-14-2, showed two peaks in its chromatogram; an additional peak was observed between 27-32 retention time, minutes. This additional peak had a peak maxima molecular weight (Mp) of 212,699 Daltons, which includes aggregated lignin and/or reaction products.

Figure 4:
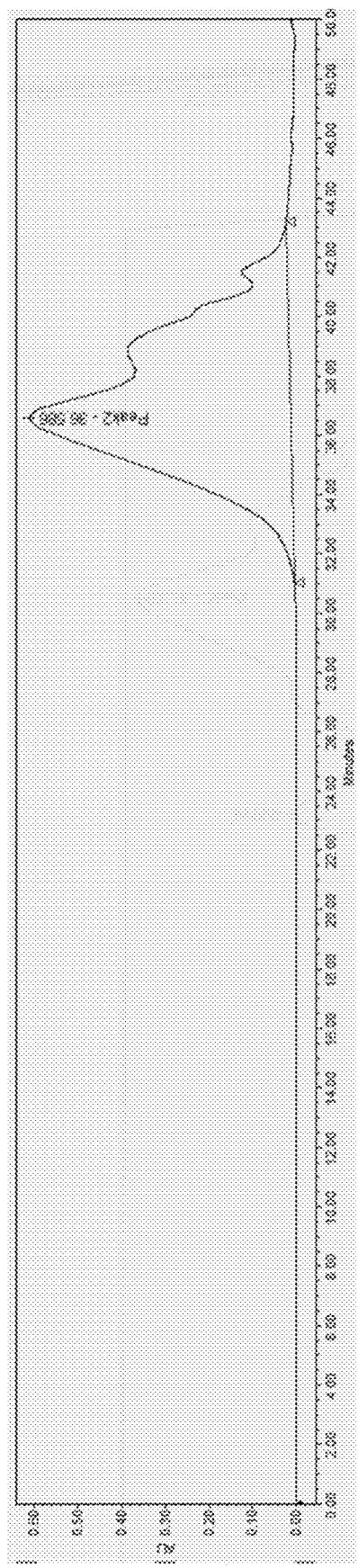
FIG. 4 is GPC chromatogram of Reax® 85A.
Figure 5:
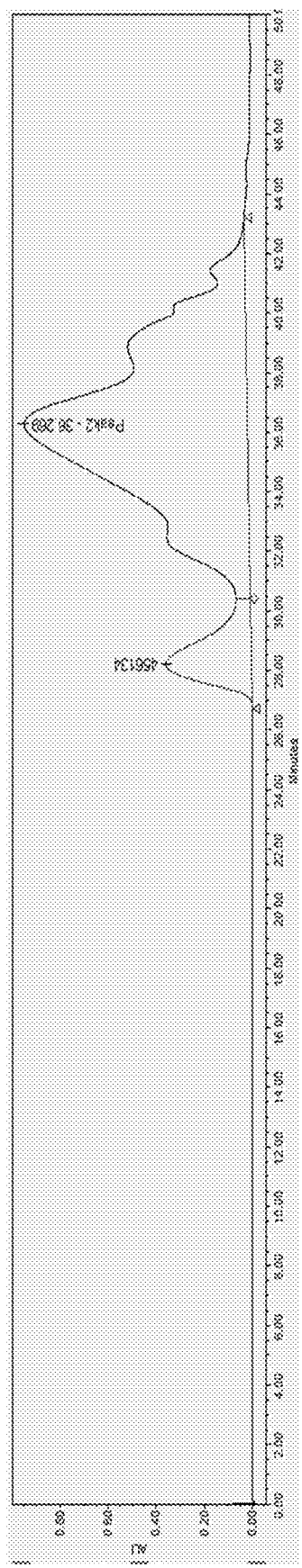
FIG. 5 is GPC chromatogram of sample 9178-14-9.

Similarly the chromatograms of the Reax 85A and 9178-14-9 are shown in FIGS. 4 and 5, respectively. The Reax® 85A has a typical weight average molecular weight of 10,000 Daltons and the peak is spread out between 31-41 mins approximately. However, the product made from the Reax® 85A i.e. 9178-14-9 showed two peaks in its chromatogram, there was an additional peak observed between 27-31 minutes. This additional peak had a peak molecular weight of 456,134 Daltons, which includes aggregated lignin and/or reaction products.

It is believed that the blend and/or reaction products of the hydrophobizing agent and/or the high molecular weight components present in the inventive compounds/composition provide the improved fluid loss control performance seen in the drilling muds tested.

TABLE 7A

Exemplary additives comprising lignin derivatives, formaldehyde, and a fatty amine.

| Identity | HCHO wt % | PC-2144-wt % | Lignin Deri. wt % | Deg. of Sulphonation of lignin Deri. | Time (hrs) | Lignin Deri. | Formalin (gms) | Wt. of PC-2144 for 15 gms active material | Wt. of Lignin Deri. for 15 gms active material | Wt. of 25% w/w slurry of lignin Deri. (gms) | Weight of HCHO gms | Tot. active wt. in rxn bottle, gms | Activity % in rxn bottle |
|---|---|---|---|---|---|---|---|---|---|---|---|---|---|
| 9178-14-2 | 0.00 | 50.00 | 50.00 | 0 | 8 | Indulin AT | 0 | 7.50 | 7.50 | 30.00 | 0 | 15.00 | 40.00% |
| 9178-14-4 | 12.33 | 43.83 | 43.83 | 0 | 1 | Indulin AT | 5 | 6.58 | 6.58 | 26.30 | 1.85 | 15.00 | 39.60% |
| 9178-14-6 | 0.00 | 50.00 | 50.00 | 1.8 | 1 | Reax 83A | 0 | 7.50 | 7.50 | 30.00 | 0 | 15.00 | 40.00% |
| 9178-14-8 | 12.33 | 43.83 | 43.83 | 1.8 | 8 | Reax 83A | 5 | 6.58 | 6.58 | 26.30 | 1.85 | 15.00 | 39.60% |
| 9178-14-9 | 6.17 | 25.80 | 68.03 | 0.9 | 4.5 | Reax 85A | 2.5 | 3.87 | 10.20 | 40.82 | 0.925 | 15.00 | 31.79% |

TABLE 7B

Exemplary additive comprising a lignin derivatives and a fatty amine.

| Identity | HCHO wt % | PC-2144-wt % | Lignin Deri. wt % | Deg. of Sulphonation of lignin Deri. | Time (hrs) | Lignin Deri. | Formalin (gms) | Wt. of PC-2144 for 250 gms active material | Wt. of Lignin Deri. for 250 gms active material | Wt. of 20% w/w slurry of lignin Deri. (gms) | Tot. active wt. in rxn flask, gms | Determined Activity % in rxn flask | Final pH |
|---|---|---|---|---|---|---|---|---|---|---|---|---|---|
| 9234-56 | 0 | 50 | 50 | 0.9 | 4.5 | Reax 85A | 0 | 125 | 125 | 625 | 750 | 35% | 10.1 | molecular weight of the hydrophobized lignin samples. For each sample, ~5 to 100 mg was weighed and dissolve in ~3 ml mobile phase then filtered via 0.2 μm filters and then injected into the series of 4 Ultrahydrogel GPC columns (thermostated to 35° C.) to generate the chromatogram. The mobile phase was prepared as follows: water: 3 L, acetonitrile: 750 ml, sodium hydroxide, 50%: 20 drops, sodium nitrate: 25 g.

Example 4.1—Fluid-Loss Control Performance of the Exemplary Additives

The composition of drilling fluid used for testing the additives prepared according to the method described in Example 4 is shown in Table 8. The exemplary additives were tested at an active concentration of 6 ppb. Since the reaction products from Table 7A, 9178-14-series, are in the aqueous form, the formulations in Table 8 were accounted for this water to obtain an oil:water ratio of 75/25. Similarly, the CaCl$_2$ powder was added to maintain a water phase salinity of 25 w/w % CaCl$_2$ in the internal phase. These fluid formulations were hot rolled at 350° F. under Nitrogen pressure of 200 psi for 16 hours in a hot roller oven. The fluids were then mixed on a multimixer for 5 mins and then tested for rheology & ES at 120° F. and HTHP fluid loss at 350° F., 500 psi differential. The rheology, ES and the HTHP filtration tests were performed according to the methods described in API Recommended Practice 13B-2, Fourth Edition, Recommended Practice for Field Testing of Oil-based Drilling Fluids.

TABLE 8

Formulation to test the exemplary additives

|  | 9178-14-2 grams | 9178-14-4 grams | 9178-14-6 grams | 9178-14-8 grams | 9178-14-9 grams | Mixing (min) |
|---|---|---|---|---|---|---|
| Diesel Oil Low Sulfur (gm) | 185.24 | 185.24 | 185.24 | 185.24 | 185.24 | 0 |
| Envamul 2157, Primary Emulsifier (gm) | 6.00 | 6.00 | 6.00 | 6.00 | 6.00 | 1 |
| Lime, Alkalinity Control Agent (gm) | 3.00 | 3.00 | 3.00 | 3.00 | 3.00 | 1 |
| Lignin based products from Table 6 in liquid form (gm) | 15.00 | 15.15 | 15.00 | 15.15 | 18.88 | 1 |
| Weight of water added (gm) | 57.93 | 57.78 | 57.93 | 57.78 | 54.06 | 13 |
| Weight of CaCl2 powder added (gm) | 22.31 | 22.31 | 22.31 | 22.31 | 22.31 |  |
| Organoclay type viscosifier (gm) | 3.00 | 3.00 | 3.00 | 3.00 | 3.00 | 4 |
| API Barium Sulphate, weighting agent (gm) | 210.81 | 210.81 | 210.81 | 210.81 | 210.81 | 10 |
| Total weight (gm) | 503.30 | 503.30 | 503.30 | 503.30 | 503.30 |  |
| Volume (ml) | 350.00 | 350.00 | 350.00 | 350.00 | 350.00 |  |
| OWR | 75/25 |  |  |  |  |  |
| Mud weight (ppg) | 12.00 |  |  |  |  |  |
| Water Phase Salinity for CaCl2 w/w % | 25% |  |  |  |  |  |
| Fluid hot roll for 16 hours at 350° F. |  |  |  |  |  |  |

Properties of the oil-based drilling fluids containing the exemplary additives of Example 4 are shown in Table 9. It can be seen that all of the exemplary additives had good control over the fluid loss at an active concentration of 6 ppb. Also, it can be seen that the exemplary additives made with the formaldehyde gave higher ES as compared to others made without the formaldehyde.

TABLE 9

Mud Properties of invention reaction products slurry between lignin derivatives, formaldehyde and fatty amine.

| Shear stress reading @120° F. given rpm | | | | | |
|---|---|---|---|---|---|
|  | 9178-14-2 | 9178-14-4 | 9178-14-6 | 9178-14-8 | 9178-14-9 |
| 600 rpm | 42.7 | 49.5 | 36.9 | 65.4 | 43.6 |
| 300 rpm | 22.4 | 27.0 | 18.4 | 36.8 | 22.0 |
| 200 rpm | 14.6 | 18.1 | 11.7 | 24.9 | 15.1 |
| 100 rpm | 7.9 | 9.7 | 5.7 | 15.0 | 8.1 |
| 6 rpm | 0.5 | 1.4 | 0.1 | 1.2 | 1.1 |
| 3 rpm | 0.5 | 1.3 | 0.0 | 1.1 | 1.0 |
| PV, CP | 20.3 | 22.5 | 18.5 | 28.6 | 21.6 |
| YP, lb/100 ft2 | 2.1 | 4.5 | −0.1 | 8.2 | 0.4 |
| Gels 10 sec, lb/100 ft$^2$ | 0.0 | 1.0 | 0.0 | 0.0 | 1.0 |
| Gels 10 min, lb/100 ft$^2$ | 5.0 | 7.0 | 0.0 | 9.0 | 6.0 |
| ES at 120° F., Volts | 783 | 1113 | 650 | 1136 | 721 |
| HTHP 500 psi @ 350 F., ml | 2.8 | 4.4 | 2.0 | 4.0 | 6.4 |

One of the exemplary additives (9178-14-9) was scaled up to about 300 gm so that it could be spray dried. 50% yield was obtained in a laboratory based spray dryer. This spray dried additive was then tested in the same formulation but it was not adjusted for water and the CaCl$_2$ powder as shown in Table 10. It can be clearly seen that even the spray dried composition also demonstrated controlled fluid loss at 350° F. There was no water in the filtrate.

One can also see the exemplary additive's also demonstrated exceptionally high ES from 650 mV to 1136 mV. In comparison, the commercial additive's demonstrate ES values less than 600 mV in similar formulations. Also, one can see that the exemplary compositions with Formaldehyde gave higher ES as compared to others made without the Formaldehyde. These exemplary additives increase ES (measured in volts) without adversely affecting rheology of the oil-based drilling fluids. The increase in ES indicates higher stability of the oil-based drilling fluids. Such oil-based drilling fluids are highly desirable in the industry.

TABLE 10

Mud Properties of spray dried products.

| | 9178-14-9 spray dried | 9178-14-9 spray dried | Mixing (min) |
|---|---|---|---|
| Diesel Oil Low Sulfur, gms | 185.24 | 185.24 | 0 |
| Envamul 2157, Primary Emulsifer (gm) | 6.00 | 6.00 | 1 |
| Lime, Alkalinity Control Agent (gm) | 3.00 | 3.00 | 1 |
| Lignin based spray dried product | 6.00 | 6.00 | 1 |
| CaCl2 brine 25% w/w, water phase salinity | 89.25 | 89.25 | 13 |
| Organoclay type viscosifier (gm) | 3.00 | 3.00 | 4 |
| Barite, weighting agent (gm) | 210.81 | 210.81 | 10 |
| Total weight (gm) | 503.30 | 503.30 | |
| Volume (ml) | 350.00 | 350.00 | |
| OWR | 75/25 | | |
| Mud weight (ppg) | 12.00 | | |
| Fluid Hot roll for 16 hours at 350° F. | | | |
| Sheer stress reading @ 120° F. for given rpm | | | |
| 600 rpm | 49.9 | 43.1 | |
| 300 rpm | 25.3 | 22.3 | |
| 200 rpm | 16.4 | 14.3 | |
| 100 rpm | 8.5 | 7.3 | |
| 6 rpm | 1.2 | 0.7 | |
| 3 rpm | 1.1 | 0.6 | |
| PV, CP | 24.6 | 20.8 | |
| YP, lb/100 ft2 | 0.7 | 1.5 | |
| Gels 10 sec, lb/100 ft² | 1.0 | 0.0 | |
| Gels 10 min, lb/100 ft² | 8.0 | 5.0 | |
| ES at 120° F., Volts | 660 | 655 | |
| HTHP 500 psi @ 350 F., ml | 7.6 | 9.2 | |

Example 4.2—Rheology Performance of the Exemplary Additives

The rheology and ES of the exemplary fluid loss additive of the present disclosure and industry fluid loss additive (styrene nethacrylate copolymer) at different concentrations in 16.6 ppg screening formulation were determined at 120° F. In particular, the composition of the mud utilized is shown in Table 11, and the composition was hot rolled for 16 hours at 150F prior to determining the rheology characteristics at 120° F., as described above, and the HPHT fluid loss at 350° F., as described above. The 600 rpm to 3 rpm dial readings of the exemplary fluid loss additive and industry fluid loss additive are presented in the Table 12. Since the 16.6 ppg screening formulation is a stable formulation, it was appropriate to determine the effect of the exemplary fluid loss additive on rheology and ES at different concentrations as compared to other industry fluid loss additive. For the effect on rheology was defined by a rheology change factor, which was calculated by the equation below and expressed as a percentage.

$$\text{Rheology Change Factor} = \sqrt{\sum_{i=3_{rpm}}^{600_{rpm}} \left( \frac{\text{Dial reading}_{FLA,i} - \text{Dial reading}_{noFLA,i}}{\text{Dial reading}_{noFLA,i}} \right)^2}$$

The rheology change factor and the ES at 120° F. in the 16.6 ppg screening formulation for the exemplary fluid loss additive and the industry fluid loss additive at different concentrations is presented in Table 12 respectively.

TABLE 11

Formulation to test exemplary additives

| Mud Additives | S.G | Mass (g) | Mixing Time (mins) |
|---|---|---|---|
| Low sulfur diesel | 0.86 | As required | |
| Primary Emulsifer, Envanmul 600 | 0.99 | 6.0 | 1 |
| Alkalinity control agent, lime | 2.21 | 3.0 | 1 |
| FLA | Based on FLA | Varied | 1 |
| Secondary emulsifier, Envamul 1884 | 0.95 | 3.0 | 1 |
| CaCl₂ brine, WPS = 33.5% w/w | 1.33 | As required | 13 |
| Organoclay | 1.60 | 2.0 | 4 |
| API Barite | 4.20 | As required | 10 |
| Total | | | 31 |
| Mud weight | | 16.6 ppg | |
| OWR | | 70/30 | |

TABLE 12

Rheology performance of exemplary additives

| Sample | Concentration on 100% active basis, ppb | 600 | 300 | 200 | 100 | 6 | 3 | PV | YP | 10 sec | 10 min | ES @ 120 F. | Rheology Change Factor | Fluid loss at 350° F. |
|---|---|---|---|---|---|---|---|---|---|---|---|---|---|---|
| No Fluid Loss Additive | 0 | 121.9 | 71.3 | 55.6 | 37.9 | 13.8 | 13.2 | 50.6 | 15.7 | 11 | 15 | 574 | 0.0 | |
| 9234-56 @ 35% w/w activity | 3 | 112 | 68.9 | 52.5 | 34.4 | 10.5 | 9.1 | 43.1 | 25.8 | 8 | 11 | 824 | 20% | 2.8 |
| 9234-56 @ 35% w/w activity | 2 | 121.1 | 72.5 | 55 | 35.9 | 10.3 | 9.8 | 48.6 | 23.9 | 11 | 13 | 673 | 11% | 2.4 |
| 9234-56 @ 35% w/w activity | 1 | 120.1 | 72.8 | 55.6 | 36.9 | 11.7 | 10.1 | 47.3 | 25.5 | 11 | 13 | 638 | 7% | 4 |
| 9234-56 @ 35% w/w activity | 0.5 | 114.2 | 69.6 | 53.4 | 35.3 | 11.5 | 10 | 44.6 | 25 | 11 | 13 | 638 | 14% | 14.6 |
| Styrene methacrylate copolymer | 3 | 215.1 | 127.7 | 96.1 | 61.8 | 19.7 | 17.8 | 87.4 | 40.3 | 16 | 23 | 608 | 177% | 2.8 |

TABLE 12-continued

Rheology performance of exemplary additives

| Sample | Concentration on 100% active basis, ppb | 600 | 300 | 200 | 100 | 6 | 3 | PV | YP | 10 sec | 10 min | ES @ 120 F. | Rheology Change Factor | Fluid loss at 350° F. |
|---|---|---|---|---|---|---|---|---|---|---|---|---|---|---|
| Styrene methacrylate copolymer | 2 | 182.9 | 108.8 | 83.5 | 53.2 | 16.5 | 15.8 | 74.1 | 34.7 | 16 | 22 | 630 | 119% | 5.2 |
| Styrene methacrylate copolymer | 1 | 153.3 | 89.5 | 67.8 | 44.7 | 14.5 | 12.8 | 63.8 | 25.7 | 13 | 20 | 596 | 58% | 2 |
| Styrene methacrylate copolymer | 0.5 | 128 | 76.5 | 57.6 | 37 | 11.7 | 10.5 | 51.5 | 25 | 11 | 15 | 454 | 8% | 34 |

The fluids with the exemplary additive of the present disclosure showed the lowest rheology change between 0.5-3 ppb (between 7 to about 20% as determined by the rheology change factor) as compared to the fluid in the absence of fluid loss additive. Comparatively, the fluid made with the styrene methacrylate type fluid loss additive showed a pronounced effect on rheology with rheology change factor being 177% at 3 ppb. The threshold concentration for exemplary fluid loss additive was 1 ppb as discussed previously and at this concentration there was very little change in the rheology. In fact, at the exemplary fluid loss additive concentration of 6 ppb a thinning effect on the fluid was observed, but the rheology was still acceptable.

The exemplary fluid loss additive exhibited the highest ES at 909 V for 6 ppb concentration. Even at 3 ppb concentration, the ES was 824 V, which was the highest observed in the 16.6 ppg screening formulation, which is significantly better than the industry fluid loss additive which had an ES of 608 V at 3 ppd. The ES values for the exemplary fluid loss additive were better than the ES of the fluid in the absence of fluid loss additive, which was 574 V. The industry fluid loss additive tested in this fluid gave on average an ES of 607.5 V±50 V across the different concentrations and 608V at 3 ppb, which is comparable to the ES of the fluid in the absence of fluid loss additive. Thus, the exemplary fluid loss additives significantly increasing the ES of the fluid.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references or publication are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. Each range disclosed herein constitutes a disclosure of any point or sub-range lying within the disclosed range. "Combinations" is inclusive of blends, mixtures, alloys, reaction products, and the like. The terms "first", "second", and the like, do not denote any order, quantity, or importance, but rather are used to denote one element from another.

The terms "fluid loss control additive" and "fluid loss additive" are used interchangeably and are synonymous for the purpose of this disclosure.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A composition comprising:
   a blend, reaction product, or a mixture thereof, of:
   one or more hydrophobizing component or agent, and
   one or more phenolic material or composition comprising a sulfonated lignin that has a degree of sulfonation between about 0.1 and about 4.0, and that includes at least one of (1) a first sulfonated lignin having a sulfonate group located on aliphatic part of the lignin, (2) a second sulfonated lignin having a sulfonate group located on aromatic part of the lignin, and (3) a third sulfonated lignin having a sulfonate group located on aromatic part of the lignin and another sulfonate group located on aliphatic part of the lignin.

2. The composition of claim 1, wherein the hydrophobizing component or agent is an amine or amide containing compound.

3. The composition of claim 1, wherein the phenolic material or composition further includes at least one of: alkoxylated lignin; esterified lignin; hydroxypropylated lignin; phenolated lignin; alkylated lignin; urethanized lignin; hydroxyalkylated lignin; sulfomethylated lignin; nitrated lignin; azo coupled lignin; and a combination thereof.

4. The composition of claim 1, wherein the blend, reaction product, or mixture thereof, further comprises formaldehyde.

5. The composition of claim 2, wherein the blend, reaction product, or mixture thereof, includes at least one of:
the first sulfonated lignin is a sulfonated Kraft lignin,
the second sulfonated lignin compound a sulfomethylated Kraft lignin; and
the third sulfonated lignin is a Kraft lignin that has been sulfonated and sulfomethylated.

6. The composition of claim 1, wherein the phenolic material or composition includes at least one of: Organosolv lignin, milled wood lignin, cellulotic enzyme lignin, enzymatic mild acidolysis lignin, lignin extracted with ionic liquids, black liquor, Kraft lignosulfonates, Kraft lignin, sulfite lignin, sulfomethylated Kraft lignin, derivatives thereof, and salts thereof.

7. The composition of claim 2, wherein the hydrophobizing component or agent includes at least one of a fatty amine or amidoamine, a fatty imidazoline, a fatty quaternary amine compound, a fatty imidazolinium compound, and salts thereof.

8. The composition of claim 7, wherein the fatty amine or amidoamine is prepared by reacting tall oil fatty acid with an amine having at least two secondary amine groups.

9. The composition of claim 2, wherein the hydrophobizing component or agent includes a fatty quaternary amine compound that includes at least one of a diamidoamine quaternary amine compound and an ester of quaternary amine compound.

10. The composition of claim 2, wherein the hydrophobizing component or agent includes at least one of diethylenetriamine (DETA), Bis-(isostearic acid amidoethyl)-N-polyethoxy-N-methyl ammonium methosulfate, N, N-bis (tallow amidoethyl) N-polyethoxy N-methylammonium methosulfate, Di (nortallowyloxyethyl) dimethyl Ammonium Chloride, tallow amine, amidoamine, and combinations thereof.

11. The composition of claim 1, wherein the composition comprises at least one of:
about 5 to about 75 percent by weight of the hydrophobizing component or agent; and
about 25 to about 95 percent by weight of the phenolic material or composition.

12. The composition of claim 1, wherein the composition comprises at least one of:
about 25 to about 45 percent by weight of the hydrophobizing component or agent; and
about 55 to about 75 percent by weight of the phenolic material or composition.

13. The composition of claim 1, wherein the blend, reaction product, or mixture thereof, further comprises formalin that comprises at least one of: about 30 to about 40% by weight of formaldehyde, and about 10 to about 15% by weight of methanol.

14. The composition of claim 1, wherein the composition is a liquid or a particulate.

15. A drilling fluid comprising an invert emulsion of a hygroscopic liquid, an oil, mineral oil, internal olefin and a drilling fluid additive that comprises the composition of claim 1.

16. The drilling fluid of claim 15, wherein at least one of:
the hygroscopic liquid is CaCl$_2$ brine;
the oil is diesel; and
the drilling fluid comprises about 0.25 to about 20 pounds per barrel (lbs/bbl) by weight of the drilling fluid additive.

17. A method of making a drilling fluid additive, the method comprising:
blending:
one or more hydrophobizing component or agent; and
one or more phenolic material or composition comprising a sulfonated lignin that has a degree of sulfonation between about 0.1 and about 4.0, and that includes at least one of: a first sulfonated lignin having a sulfonate group located on aliphatic part of the lignin and; a second sulfonated lignin having a sulfonate group located on aromatic part of the lignin; and a third sulfonated lignin having a sulfonate group located on aromatic part of the lignin and another sulfonate group located on aliphatic part of the lignin.

18. The method according to claim 17, wherein at least one of:
the blending is performed under conditions that results in a reaction product of the blended components; and
the hydrophobizing component or agent is an amine or amide containing compound.

19. The method of claim 18, wherein at least one of:
the phenolic material or composition includes at least one of: alkoxylated lignin, esterified lignin, hydroxypropylated lignin, phenolated lignin, alkylated lignin, urethanized lignin, hydroxyalkylated lignin, sulfomethylated lignin, nitrated lignin, azo coupled lignin, and combinations thereof; and
the phenolic material or composition includes at least one of: Organosolv lignin, milled wood lignin, cellulotic enzyme lignin, enzymatic mild acidolysis lignin, lignin extracted with ionic liquids, black liquor, Kraft lignosulfonates, Kraft lignin, sulfite lignin, sulfomethylated Kraft lignin, derivatives thereof, and salts thereof.

20. The method of claim 19, wherein the method comprises at least one of:
the sulfonated lignin includes the first sulfonated lignin having a degree of sulfonation between 0.1 and 2.2;
preparing an aqueous solution of the phenolic material or composition, wherein the sulfonated lignin is about 5 to about 55 percent by weight of the aqueous solution;
the blending includes formaldehyde;
heating the blended mixture to a temperature of 25° C. to 120° C.

21. The method of claim 17, wherein the method further comprises spray drying the blend, reaction product, or mixture thereof, to obtain a powder from the blend, reaction product, or mixture thereof.

22. The method of claim 19, wherein the sulfonated lignin includes the second sulfonated lignin having a degree of sulfonation between about 0.1 and about 2.9.

23. A composition comprising:
a blend, reaction product, or a mixture thereof, of:
formalin that comprises at least one of: about 30 to about 40% by weight of formaldehyde, and about 10 to about 15% by weight of methanol;
one or more hydrophobizing component or agent, and
one or more phenolic material or composition comprising phenolic polymers or salts thereof.

24. The composition of claim 23, wherein at least one of:
the phenolic polymers are cross-linked; and
the hydrophobizing component or agent is an amine or amide containing compound.

25. The composition of claim 23, wherein the phenolic material or composition includes at least one of: lignin, lignin derivative, and salts thereof.

26. The composition of claim 25, wherein the lignin derivative includes at least one of: a first sulfonated lignin having a sulfonate group located on aliphatic part of the lignin; a second sulfonated lignin having a sulfonate group located on aromatic part of the lignin; a third sulfonated lignin having a sulfonate group located on aromatic part of the lignin and another sulfonate group located on aliphatic part of the lignin; alkoxylated lignin; esterified lignin; hydroxypropylated lignin; phenolated lignin; alkylated lignin; urethanized lignin; hydroxyalkylated lignin; sulfomethylated lignin; nitrated lignin; azo coupled lignin; and a combination thereof.

27. The composition of claim 26, wherein the blend, reaction product, or mixture thereof, includes at least one of:
the first sulfonated lignin that is a sulfonated Kraft lignin,
the second sulfonated lignin that is a sulfomethylated Kraft lignin; and
the third sulfonated lignin is a Kraft lignin that has been sulfonated and sulfomethylated.

28. The composition of claim 26, wherein the blend, reaction product, or mixture thereof, includes at least one of:
the first sulfonated lignin has a degree of sulfonation between about 0.1 and about 4.0,
the second sulfonated lignin has a degree of sulfonation between about 0.1 and about 4.0, and
the third sulfonated lignin has a degree of sulfonation between about 0.1 and about 4.0.

29. The composition of claim 23, wherein the phenolic material or composition includes at least one of Organosolv lignin, milled wood lignin, cellulotic enzyme lignin, enzymatic mild acidolysis lignin, lignin extracted with ionic liquids, black liquor, Kraft lignosulfonates, Kraft lignin, sulfite lignin, sulfomethylated Kraft lignin, derivatives thereof, and salts thereof.

30. The composition of claim 23, wherein the hydrophobizing component or agent includes at least one of a fatty amine or amidoamine, a fatty imidazoline, a fatty quaternary amine compound, a fatty imidazolinium compound, and salts thereof.

31. The composition of claim 30, wherein the fatty amine or amidoamine is prepared by reacting tall oil fatty acid with an amine having at least two secondary amine groups.

32. The composition of claim 23, wherein the hydrophobizing component or agent includes a fatty quaternary amine compound that includes at least one of a diamidoamine quaternary amine compound and an ester of quaternary amine compound.

33. The composition of claim 23, wherein the hydrophobizing component or agent includes at least one of diethylenetriamine (DETA), Bis-(isostearic acid amidoethyl)-N-polyethoxy-N-methyl ammonium methosulfate, N, N-bis (tallow amidoethyl) N-polyethoxy N-methylammonium methosulfate, Di (nortallowyloxyethyl) dimethyl Ammonium Chloride, tallow amine, amidoamine, and combinations thereof.

34. The composition of claim 23, wherein the composition comprises at least one of:
about 5 to about 75 percent by weight of the hydrophobizing component or agent; and
about 25 to about 95 percent by weight of the phenolic material or composition.

35. The composition of claim 23, wherein the composition comprises at least one of:
about 25 to about 45 percent by weight of the hydrophobizing component or agent; and
about 55 to about 75 percent by weight of the phenolic material or composition.

36. The composition of claim 23, wherein the blend, reaction product, or mixture thereof, further comprises formalin that comprises at least one of: about 30 to about 40% by weight of formaldehyde, and about 10 to about 15% by weight of methanol.

37. The composition of claim 23, wherein the composition is a liquid or a particulate.

38. A drilling fluid comprising an invert emulsion of a hygroscopic liquid, an oil, mineral oil, internal olefin and a drilling fluid additive that comprises the composition of claim 23.

39. The drilling fluid of claim 38, wherein at least one of:
the hygroscopic liquid is $CaCl_2$ brine;
the oil is diesel; and
the drilling fluid comprises about 0.25 to about 20 pounds per barrel (lbs/bbl) by weight of the drilling fluid additive.

40. A method of making a drilling fluid additive, the method comprising:
blending:
one or more hydrophobizing component or agent;
one or more phenolic material or composition comprising phenolic polymers or salts thereof; and
formalin that comprises at least one of: about 30 to about 40% by weight of formaldehyde, and about 10 to about 15% by weight of methanol.

41. The method according to claim 40, wherein at least one of:
the blending is performed under conditions that results in a reaction product of the blended components;
the phenolic polymers are cross-linked;
the hydrophobizing component or agent is an amine or amide containing compound;
the phenolic material or composition includes lignin, lignin derivative, or salts thereof.

42. The method of claim 41, wherein at least one of:
the lignin derivative is selected from the group consisting of: a first sulfonated lignin having a sulfonate group located on aliphatic part of the lignin, a second sulfonated lignin having a sulfonate group located on aromatic part of the lignin, a third sulfonated lignin having a sulfonate group located on aromatic part of the lignin and another sulfonate group located on aliphatic part of the lignin, alkoxylated lignin, esterified lignin, hydroxypropylated lignin, phenolated lignin, alkylated lignin, urethanized lignin, hydroxyalkylated lignin, sulfomethylated lignin, nitrated lignin, azo coupled lignin, and combinations thereof; and
the phenolic material or composition includes at least one of Organosolv lignin, milled wood lignin, cellulotic enzyme lignin, enzymatic mild acidolysis lignin, lignin extracted with ionic liquids, black liquor, Kraft lignosulfonates, Kraft lignin, sulfite lignin, sulfomethylated Kraft lignin, derivatives thereof, and salts thereof.

43. The method of claim 42, wherein the method comprises at least one of:
the lignin derivative is a first sulfonated lignin having a sulfonate group located on aliphatic part of the lignin and having a degree of sulfonation between 0.1 and 2.2;
preparing an aqueous solution of the phenolic material or composition, wherein the phenolic material or composition includes at least one of the lignin, the lignin derivative, or salts thereof, and is about 5 to about 55 percent by weight of the aqueous solution;

the blending includes formaldehyde; and heating the blended mixture to a temperature of 25° C. to 120° C.

44. The method of claim 40, wherein the method further comprises spray drying the blend, reaction product, or mixture thereof, to obtain a powder from the blend, reaction product, or mixture thereof.

45. The method of claim 42, wherein the lignin derivative includes a second sulfonated lignin having a sulfonate group located on aromatic part of the lignin, and having a degree of sulfonation between about 0.1 and about 2.9.

* * * * *